(12) United States Patent
Pilnock et al.

(10) Patent No.: US 12,182,286 B2
(45) Date of Patent: *Dec. 31, 2024

(54) PSEUDORANDOM OBJECT PLACEMENT IN HIGHER DIMENSIONS IN AN AUGMENTED OR VIRTUAL ENVIRONMENT

(71) Applicant: 8 Bit Development Inc., Mesa, AZ (US)

(72) Inventors: Eric M. Pilnock, Mesa, AZ (US); Kenneth E. Irwin, Jr., Dawsonville, GA (US); Michael T. Day, Mesa, AZ (US); Andrew J. Mound, Atlanta, GA (US)

(73) Assignee: 8 BIT DEVELOPMENT INC., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,581

(22) Filed: Dec. 27, 2023

(65) Prior Publication Data

US 2024/0160757 A1 May 16, 2024

Related U.S. Application Data

(63) Continuation of application No. 17/860,552, filed on Jul. 8, 2022, now abandoned, which is a continuation (Continued)

(51) Int. Cl.
*H04L 29/06* (2006.01)
*G06F 7/58* (2006.01)
(Continued)

(52) U.S. Cl.
CPC .......... *G06F 21/6209* (2013.01); *G06F 7/582* (2013.01); *G06F 16/908* (2019.01); *G06F 16/909* (2019.01); *H04L 9/0825* (2013.01)

(58) Field of Classification Search
CPC .. G06F 21/6209; G06F 16/909; G06F 16/908; G06F 7/582; G06F 9/0825
See application file for complete search history.

(56) References Cited

U.S. PATENT DOCUMENTS 6,054,991 A 4/2000 Crane et al.
8,869,292 B2 10/2014 Eluard et al.
(Continued)

*Primary Examiner* — Evans Desrosiers
(74) *Attorney, Agent, or Firm* — Panitch Schwarze Belisario & Nadel LLP

(57) ABSTRACT

A method and apparatus are disclosed for automatically assigning flagged locations that are potentially discoverable when encountered by one or more of Augmented Reality (AR) or Virtual Reality (VR) devices and assigning a value to each flagged location which is revealed when the one or more AR or VR devices encounters a flagged location. A terrain database is maintained that is comprised of a higher dimensional map of portions of an environmental model that establishes a total area of the higher dimensional environmental model. Flagged locations are generated in the terrain database utilizing input from a Random Number Generator (RNG) function. A real time server automatically assigns a value to each of the flagged locations when an AR or VR device discovers a flagged location. The assigned value is displayed to the AR or VR device that discovered the respective flagged location.

20 Claims, 16 Drawing Sheets

Related U.S. Application Data of application No. 17/686,936, filed on Mar. 4, 2022, now Pat. No. 11,386,215, which is a continuation of application No. 17/381,683, filed on Jul. 21, 2021, now Pat. No. 11,270,011.

(60) Provisional application No. 63/103,288, filed on Jul. 28, 2020.

(51) Int. Cl.
| | |
|---|---|
| *G06F 16/908* | (2019.01) |
| *G06F 16/909* | (2019.01) |
| *G06F 21/62* | (2013.01) |
| *H04L 9/08* | (2006.01) |

(56) References Cited

U.S. PATENT DOCUMENTS

| | | | |
|---|---|---|---|
| 10,735,691 B2* | 8/2020 | Schmirler | H04N 23/698 |
| 2008/0030429 A1 | 2/2008 | Hailpern et al. | |
| 2020/0370994 A1* | 11/2020 | Santarone | G01S 1/08 |
| 2020/0400439 A1 | 12/2020 | Thompson et al. | |
| 2021/0074068 A1* | 3/2021 | Spivack | G06N 20/00 |

\* cited by examiner

| Item | Metadata Description | Modified Area | Grid Location |
|------|---------------------|---------------|---------------|
| 1 | Body of Water | None | |
| 2 | Vegas Strip | 1 meter parameter | |
| 3 | #Defined Hazard (Volcano) | 30 meter radius | 36.1212°N, 115.1765°W |
| 4 | Trump Hotel | 10 meter radius | |
| 5 | Circus Circus Hotel | 10 meter radius | |

| Item | Metadata Description | Modified Area | Grid Location |
|---|---|---|---|
| 1 | Bellagio Hotel | None | |
| 2 | MGM Grand Hotel | 3 meter parameter | |
| 3 | New York New Your Hotel | 12 meter radius | |
| 4 | Wynn/Encore Hotel | 10 meter radius | |

339

321 → Item
322 → Metadata Description
323 → Modified Area
324 → Grid Location

| Flag Location | Metadata Description | Ciphertext Val Number | Cleartext Val Number |
|---|---|---|---|
| 1 | Bellagio Hotel | $E2229165_{16}$ | $94964623_{16}$ |
| 2 | Bellagio Hotel | $6AC1232B_{16}$ | $F6978423_{16}$ |
| 3 | Bellagio Hotel | $72974B52_{16}$ | $AAC12340_{16}$ |
| 4 | Mirage Hotel | $91213F12_{16}$ | $49904633_{16}$ |
| 5 | Rio Hotel | $87583553_{16}$ | $79104618_{16}$ |
| 6 | Mandalay Bay Hotel | $10449575_{16}$ | $86130428_{16}$ |
| 7 | New York New York Hotel | $43065553_{16}$ | $3903579D_{16}$ |
| 8 | New York New York Hotel | $45468562_{16}$ | $E8414154_{16}$ |
| 9 | New York New York Hotel | $125223B9_{16}$ | $94255066_{16}$ |
| 10 | MGM Grand Hotel | $63272577_{16}$ | $5241852A_{16}$ |
| 11 | MGM Grand Hotel | $25862443_{16}$ | $44711325_{16}$ |
| 12 | MGM Grand Hotel | $64498561_{16}$ | $62071237_{16}$ |
| 13 | Hooter's Hotel | $10664368_{16}$ | $42083930_{16}$ |
| 14 | Stratosphere Hotel | $68166971_{16}$ | $20666543_{16}$ |
| 15 | Wynn & Encore Hotel | $59884004_{16}$ | $23526764_{16}$ |
| 17 | Wynn & Encore Hotel | $91361043_{16}$ | $98769379_{16}$ |
| 18 | Wynn & Encore Hotel | $18861536_{16}$ | $66816521_{16}$ |

PSEUDORANDOM OBJECT PLACEMENT IN HIGHER DIMENSIONS IN AN AUGMENTED OR VIRTUAL ENVIRONMENT

CROSS-REFERENCE TO RELATED APPLICATIONS

This application is continuation of copending U.S. Non-Provisional patent application Ser. No. 17/860,552 filed Jul. 8, 2022, which, in turn, is a continuation of U.S. Non-Provisional patent application Ser. No. 17/686,936 filed Mar. 4, 2022, now U.S. Pat. No. 11,386,215, which, in turn, is a continuation of U.S. Non-Provisional patent application Ser. No. 17/381,683 filed Jul. 21, 2021, now U.S. Pat. No. 11,270,011. Each of the above-identified applications are incorporated by reference herein.

This application claims priority to U.S. Provisional Patent Application No. 63/103,288 filed Jul. 28, 2020, which is incorporated by reference herein.

BACKGROUND OF THE INVENTION

The present invention relates to a system and method for allowing a plurality of users to interact with two or three dimensional virtual or augmented environments in which a plurality of objects are placed throughout in a pseudorandom fashion. Ideally, the inherent aspects of this invention also enable security countermeasures, thereby protecting the two or three dimensional virtual or augmented environment from malicious users.

The design and use of Virtual Reality (VR) systems is a rapidly growing field of computer science. The object of a "virtual reality system" is to give users the ability to explore environments that exist only as models in the memory of a computer. These environments may be models of the real world (e.g., streets of Las Vegas, the interior of a casino, Disney World, the valley of the Grand Canyon), or they may be representations of purely imaginary worlds (e.g., Harry Potter, Game of Thrones), or worlds inaccessible by human beings (e.g., the interiors of molecules, the center of our galaxy, the bottom of the ocean).

The Virtual Reality (VR) industry started by providing devices for medical, flight simulation, automobile industry design, and military training purposes circa 1970. The 1990s saw the first widespread commercial releases of consumer headsets—e.g., in 1991, Sega announced the Sega VR headset for arcade games and the Mega Drive console. By 2016 there were at least 230 companies developing VR related products. Facebook currently has around 400 employees focused on VR development; Google, Apple, Amazon, Microsoft, Sony, and Samsung all have dedicated VR and Augmented Reality (AR) groups.

The first commercial AR experiences were largely in the entertainment and gaming businesses, but now other industries are also developing AR applications—e.g., knowledge sharing, educating, managing information, organizing distant meetings, telemedicine. Augmented reality is also transforming the world of education, where content may be accessed by scanning or viewing an image with a mobile device. Probably the most popular example of AR is the game "Pokémon Go", which was released to the public in July of 2016.

Pokémon Go was a 2016 AR mobile game developed and published by Niantic in collaboration with The Pokémon Company for iOS (i.e., Apple) and Android devices. It uses the mobile device Global Positioning System ("GPS") to locate, capture, battle, and train virtual creatures, called Pokémon, that appear as if they are in the player's real world geographical location. Objects on the map include "PokéStops" and "Pokémon Gyms" typically located at real world geographical places of interest. Thus, with the game Pokémon Go various virtual objects (e.g., PokéStops, Pokémon Gyms) were placed predetermined in a Three Dimensional ("3D") environment—i.e., real world geographical locations. Pokémon Go was credited with popularizing location-based and AR technology, promoting physical activity, and helping local businesses grow due to increased foot traffic. However, the Pokémon Go 3D real-world virtual object placement was far from optimal with non-optimal heterogeneous distribution of virtual objects being placed at dangerous, improper, or inconvenient locations—e.g., the Korean Demilitarized Zone (DMZ), train tracks, roads, Hiroshima Memorial park, the Holocaust Museum, Bosnian minefields. Additionally, the security level of the game (though typical for a "play for fun" type game) would be inadequate for games offering monetary awards or prizes with the United States (US) Department of Defense (DoD) restricting the use of the game on their property (e.g., the Pentagon), citing security risks of collecting secret information.

Most of the problems associated with Pokémon Go arise from the surprising fact that it is very difficult to randomly or pseudorandomly distribute objects in a secure manner in any higher dimensional space. This problem becomes compounded when various monetary prizes are distributed in two or more dimensions. When attempting to pseudo-randomly distribute prizes, the aggregate of all winning outcomes in any prize distribution is a predetermined percentage payout of the total revenues that would be generated by the sale incorporating the particular pseudorandomized prize distribution.

For example, lottery instant (scratch-off) tickets employ a pseudorandom prize distribution over essentially a one dimensional space consisting of sequentially numbered instant paper tickets. These outcomes are created using essentially similar methodologies throughout the industry. For example, a run of 24 million tickets that has 120 top prize payouts of $10,000 and a payout percentage of 55%, may be broken up into 100 pools of 240,000 tickets each. The $10,000 winners will be distributed as evenly as possible among the 100 pools, so there will be at least one top prize in each pool, with 20 pools having two top prizes. The 80 pools without the two top prizes will be compensated by offering more low and mid-tier prizes, so that the payout percentage is exactly 55% for each 240,000 ticket pool. Each of these 240,000 ticket pools would be further broken up into packs of tickets, typically 200 to 400 tickets per pack. Thus, the set of all instant tickets printed from serial number "1" to "n" essentially form a one dimensional line with pseudorandom prize distribution spread along the line in a more-or-less heterogeneous fashion.

Some lotteries place restrictions on the distribution of outcomes, including limits on the number of high tier winners per pack; how many consecutive non-winning tickets 2% of the time; and the maximum number of non-winning tickets per print run. In arranging the game press run, the lottery authority and designated contractor decides how many tickets are to be sold, the prize fund or payback percentage of the game as a whole, and what prizes will be awarded and the frequency of winning tickets among the total number of tickets. For example, assume a lottery wanted to sell a total of twenty tickets and have a payout percentage for the game of 50% with each ticket selling for $1. In this example, the prize distribution outcome might consist of one $5 winner, one $2 winner, and three $1 winners and may be represented as: "5, 2, 1, 1, 1, 0, 0, 0, 0, 0, 0, 0, 0, 0, 0, 0, 0, 0, 0." Note that, as previously described, the finite series of win or lose outcomes is a sequential one dimensional series of tickets that is completely deterministic. There is no randomness at all. Of course, the lottery does not want to have the first five tickets sold to be winners, so the tickets are shuffled to achieve a pseudorandomized order for printing the tickets. In this example, the pseudorandomized resulting printing sequence might look like the following: "0, 0, 0, 0, 0, 1, 0, 2, 0, 0, 5, 0, 0, 0, 0, 1, 0, 0, 0, 1." As tickets are purchased by consumers, they are removed from the sequence of outcomes. From the above set of outcomes, a consumer purchasing four tickets might buy four losing tickets—"0, 0, 0, 0." If the next consumer purchased three tickets, he or she may get "0,1,0." The next three tickets sold might be "2,0,0." This process continues until the entire sequence of outcomes (twenty in this example) is exhausted.

Therefore, even for a simple one dimensional instant ticket pseudorandom prize distribution, it can be appreciated that the complexity of pseudorandomly arranging a heterogeneous appearing series of winning and losing outcomes is remarkably complex. This complexity literally grows exponentially as pseudorandom prize distributions are extended to higher dimensional spaces. Furthermore, when increasing the number of dimensions for a pseudorandom prize distribution unexpected correlations can be inadvertently generated that can make the distribution appear homogeneous or worse—predictable.

For example, an "Ulam spiral" or "prime spiral" is a graphical depiction of the set of prime numbers, devised by mathematician Stanislaw Ulam in 1963 constructed by writing the positive integers in a square spiral and specially marking the prime numbers. FIG. 1A provides an exemplary illustration of an "Ulam spiral" or "prime spiral" exhibiting how by simply rearranging the one dimensional line of the positive integers into a two dimensional spiral arrangement on a square lattice 100 a striking appearance in the resulting spiral of prominent diagonal, horizontal, and vertical lines containing large numbers of primes becomes evident 101. Thus, even though there is no known formula for separating prime numbers from composite numbers certain patterns can become surprisingly apparent, simply by rearranging a one dimensional line of the positive integers into a two dimensional spiral arrangement on a square lattice 101. In FIG. 1B a 200×200 Ulam spiral is illustrated where black dots represent prime numbers 105. In FIG. 1B diagonal lines are clearly visible, confirming that the pattern continues. Horizontal and vertical lines with a high density of primes, while less prominent, are also evident. In contrast, FIG. 1C illustrates a similarly constructed spiral 110 (i.e., at the same density of primes in a 200×200 spiral) with random odd numbers colored black with far fewer line correlations. Again, seemingly pseudorandom distributed one dimensional data (i.e., prime numbers) appears predictable when simply arranged in a higher (i.e., second) dimension.

Another real world example of elevating seemingly random number selection to higher dimensions revealing unforeseen correlations and predictabilities was inadvertently discovered by International Business Machine ("IBM") corporation in the 1960's when the company implemented its pseudorandom RANDU function as part of its standard software package. The IBM RANDU function essentially multiplied each given non-random input number by a large multiplier "K" (K=65,539 in the RANDU function), then divided the answer by another number "M" (M=2,147,483,648 in the RANDU function) and kept the remainder as the pseudorandom output. The problem was not only that this methodology for generating pseudorandom numbers is fundamentally flawed (i.e., using this methodology, any sequence of "pseudorandom" output numbers would theoretically line up on a graph; though, depending on the selection of K and M the aligning graph may be very complicated with upwards of ten dimensions possible); however, the function with the RANDU this fundamental problem was compounded by IBM's choice of the values for K and M. Particularly, IBM's choice for the value of K was only three more than a power of two (i.e., $65,539=2^{16}+3$) when that value was combined with a modulus M, which was a power of two (i.e., $2,147,483,648=2^{31}$) the RANDU function's "pseudorandom" output became non-random and furthermore organized and consequently predictable.

For example, FIG. 1D provides a three-dimensional graph 120 generated by Wikipedia's Luis Sanchez of the IBM RANDU function plotting 100,000 "pseudorandom" (i.e., $x$, $y$, and $z$) output values with each point representing three consecutive pseudorandom values—i.e., $x$, $y$, and $z$. From a cursory observation, it is clearly evident that all of the RANDU "pseudorandom" points fall in one of fifteen two-dimensional planes—e.g., 121. Consequently, since all IBM RANDU "pseudorandom" output numbers fall into fifteen neat planes when plotted into three dimensions, utilizing IBM's RANDU "pseudorandom" outputs for any type of VR or AR three dimensional model's pseudorandom placement of virtual objects would be predictable and consequently unacceptable, especially for pseudorandomly placing prizes of monetary value. For example, if the IBM RANDU function were utilized to determine the hiding place of prizes in a virtual three dimensional environment mapped in a virtual $x$, $y$, and $z$ grid space, all of the prizes would literally be located in the fifteen planes 121 illustrated 120 in FIG. 1D.

Some attempts to mitigate the problem of distribution of objects in higher dimensions have been attempted, most notably U.S. Pat. No. 6,054,991 (Crane et al.) and U.S. Pat. No. 8,869,292 (Eluard et al.); and U.S. Patent Application Publication No 2008/0030429 (Hailpern et al.) However, Crane et al. primarily discloses modeling the relative position and movement of objects in a simulated three dimensional virtual reality environment and does not address the problem of pseudorandomly distributing the objects in the environment. The disclosure of Eluard et al. concerns passing "protected devices" in a three dimensional environment from one user to another and again does not address the problem of pseudorandomly distributing the objects in the environment. Finally, the Hailpern et al. disclosure primarily concerns " . . . placing a user in a known environment; acquiring a video image from a perspective such that a field of view of the video camera simulates the user's line of sight; tracking the user's location, rotation and line of sight; filtering the video image to remove video data associated with the known environment without effecting video data associated with the user; overlaying the video image after filtering onto a virtual image with respect to the user's location to generate a composite image; and displaying the composite image in real time at a head mounted display" (Abstract) and again does not address the problem of pseudorandomly distributing the objects in the environment.

It is therefore highly desirable to develop techniques and methodologies for ensuring pseudorandom distributions and placement of objects in higher dimensions. Ideally, these pseudorandom distribution mechanisms would also provide added security against nefarious persons attempting to compromise the integrity of the system. The present invention essentially eliminates or solves problems of ensuring pseudorandom distributions of objects in higher dimensions while also providing these desired security countermeasures.

SUMMARY OF THE INVENTION

A general aspect of the present invention relates to assigning flagged locations in a defined two or three dimensional environmental model. These two or three dimensional environmental models may be models of the real world (e.g., streets of Las Vegas, the interior of a casino, Disney World, the valley of the Grand Canyon), or they may be representations of purely imaginary worlds (e.g., Harry Potter, Game of Thrones) or worlds inaccessible by human beings (e.g., the interiors of molecules, the center of our galaxy, the bottom of the ocean). Regardless of the type of two or three dimensional environmental model, with this general embodiment an automated process analyzes the given two or three dimensional environmental model flagging potential locations for future object placement. This automated process generates a plurality of flagged locations based on distribution criteria, randomized inputs, and environmental terrain resulting in an output pseudorandom distribution of flagged locations that conform to a priori rules and guidelines.

In an optional preferred specific embodiment of this general aspect, a preamble process analysis of the environmental terrain is conducted where various "Keep Out Areas" or "KOAs" are established before the automated process flags potential locations, thereby ensuring that no flagged location will appear in a KOA. The KOAs are automatically generated based on a priori rules specific to the two or three-dimensional environmental model being analyzed. For example, in a real world Augmented Reality (AR) environmental model, where consumers are interacting with the model in the real world, potentially hazardous or sensitive areas could be defined as KOAs—e.g., KOAs defined for thirty feet on either side of a highway or train track, KOAs defined for five hundred feet on either side a state or country border, KOAs defined for a three hundred feet radius around a monument or memorial. Additionally, optional "Desirable Areas" or "DAs" where it is preferable to designate a flagged area may also be incorporated as part of the preamble analysis—e.g., a store paying for foot traffic to increase promotions. The preamble generated KOAs and DAs thereby overcoming many of the non-optimal distributions of prior art (e.g., Pokémon Go having a Pokémon Gym in the North and South Korea DMZ) while possibly enhancing the interactive experience.

Once the general embodiment's first automated process assigns flagged locations to the given two or three dimensional environmental model, a second automated process assigns objects of varying value to each of the flagged locations as part of the general embodiment. Notice that by flagging the location with one process and assigning objects of value in a second sequential process each flagged location will be entirely independent of the value assigned to the location, thereby reducing the possibility that an object's location could function as a tell or disclosure for a hidden value. Additionally, the assignment of objects of value as a secondary process after locations have been flagged allows for the optional possibility of balancing prize distributions across two and three dimensional locations while enhancing security. Finally, the two step process first determines the flagged locations and then determines which (if any) objects of value are placed in the flagged locations, independently enabling either real time assignment of object value for predetermined flagged locations as game play commences or assignment of predetermined flagged locations and object values before game play commences.

In one embodiment, the value of objects may be assigned to flagged locations in real time as they are discovered by a Random Number Generator (RNG) or a Pseudo Random Number Generator (PRNG). This embodiment having the advantages of simplicity and reasonably high security with the disadvantages of non-optimal value distribution (e.g., highly populated or frequented model areas may receive a disproportionate allocation of prize values due to the higher number of attempts than lower populated or less frequented areas) as well as possible feedback loops being established via social media or other communications (e.g., consumers bragging that they won "$X$" prize at location "$Y$") again due to highly frequented areas.

In another preferred embodiment, the values of objects are assigned in advance via a separate process that attempts to balance the outcome of price payouts to a long term Expected Value (EV) for consumer selection of objects within the two or three dimensional environmental model, such that the consumer EV is maintained over any reasonable object selection distribution—e.g., evaluate the distribution of outcomes, include limits on the number of high tier winners per area, assess how many consecutive non-winning objects may be placed adjacent to each other, etc. This preferred embodiment having the advantages of a more balanced prize distribution for the consumer via forced heterogeneous value distribution over the two or three dimensions and possibly greater environmental model longevity with the disadvantages of potentially lesser security and greater complexity.

In yet another embodiment, validation codes are assigned and embedded with each object at a flagged location, thereby providing a pointer to a separate value or prize code lookup table to determine the actual value of the object at the location. In a first specific embodiment, the validation codes are encrypted preferably with a key generated by a combination of the linked flagged location the object was assigned to and other ancillary data—e.g., a Cyclic Redundancy Code or "CRC" of the cleartext validation code, separate keys per areas or pools, etc. In a second specific embodiment, some validation codes (e.g., high tier validation codes) become processing flags triggering a real time RNG or TRNG drawing, where the ultimate prize awarded is determined by the outcome of the RNG or TRNG drawing. This second specific embodiment having the advantages or potentially higher security and the option to offer a potentially higher prize value (e.g., one billion dollars) that may be financed by an insurance policy depending on the outcome of the RNG or TRNG drawing with the disadvantage of greater complexity.

In all of these embodiments, objects of varying value are assigned to flagged locations. The essential concept of the invention is to provide a reliable heterogeneous appearing distribution of values for objects pseudorandomly distributed over two or higher dimensional space.

Objects and advantages of the invention will be set forth in part in the following description, or may be apparent from the present description, or may be learned through practice of the invention. Described are a number of value assignment mechanisms and methodologies that provide practical details for reliably and securely distributing objects of varying value over two or higher dimensional space thereby ensuring a reliable heterogeneous appearing distribution.

Although the examples provided herein are primarily related to AR and VR games, it is clear that the same methods are applicable to any type of AR or VR application—e.g., pseudo randomization of faults in a VR training model, statistical modeling of virus spread over three dimensions.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3C is an exemplary database of Keep Out Areas (KOA) in accordance with the embodiments of FIGS. 2A thru 2D and 3B;

FIG. 3E is an exemplary database of Desirable Areas (DA) in accordance with the embodiments of FIGS. 2A thru 2D and 3B;

FIG. 3H is an exemplary flagged areas coordination with the Validation database in accordance with the embodiments of FIGS. 2A thru 2D and 3G.

DETAILED DESCRIPTION OF THE INVENTION

Figure 1A:
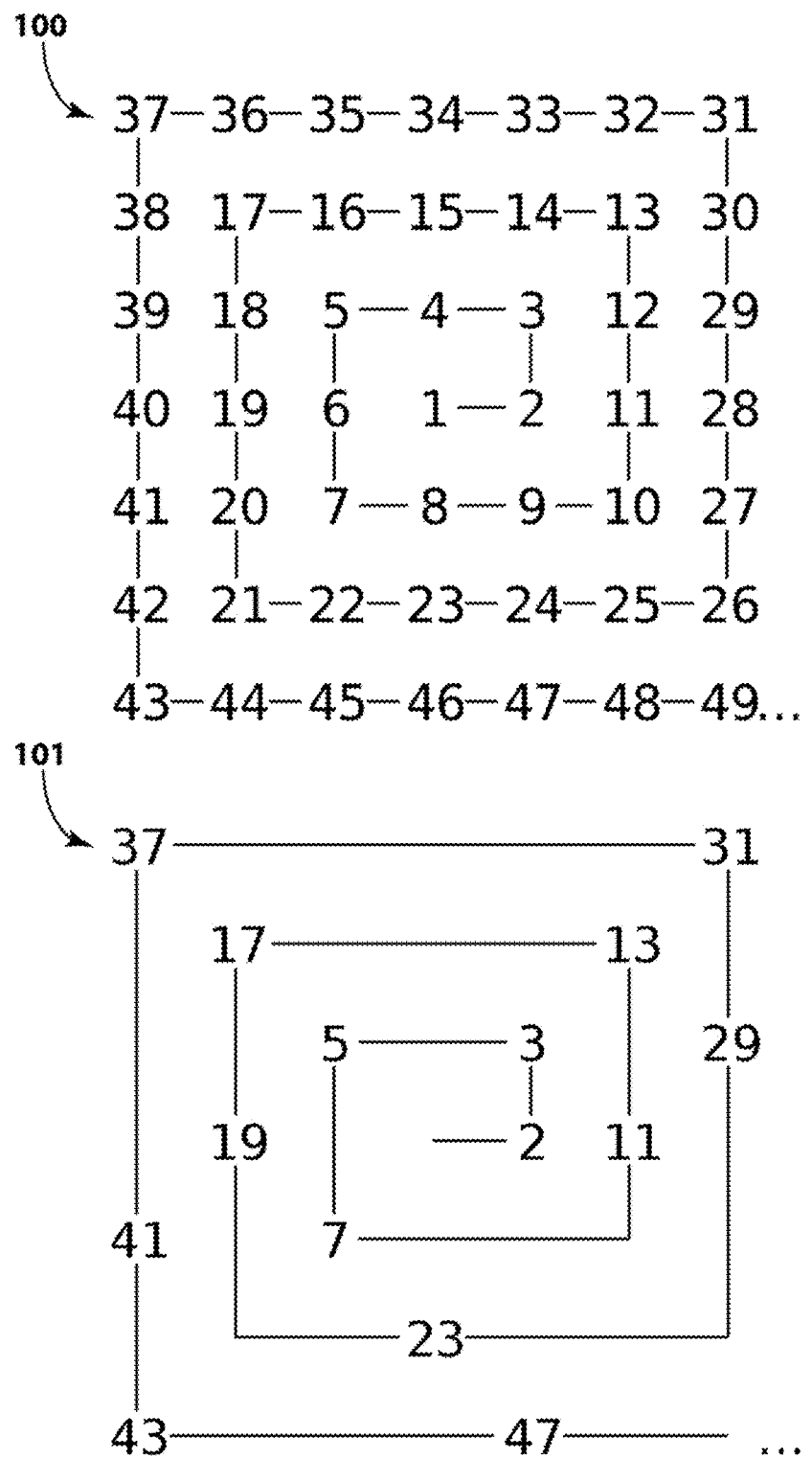
FIG. 1A is a first exemplary view of the prior art "Ulam spiral" or "prime spiral" highlighting the striking appearance in the spiral of prominent diagonal, horizontal, and vertical lines containing large numbers of primes.
Figure 1B:
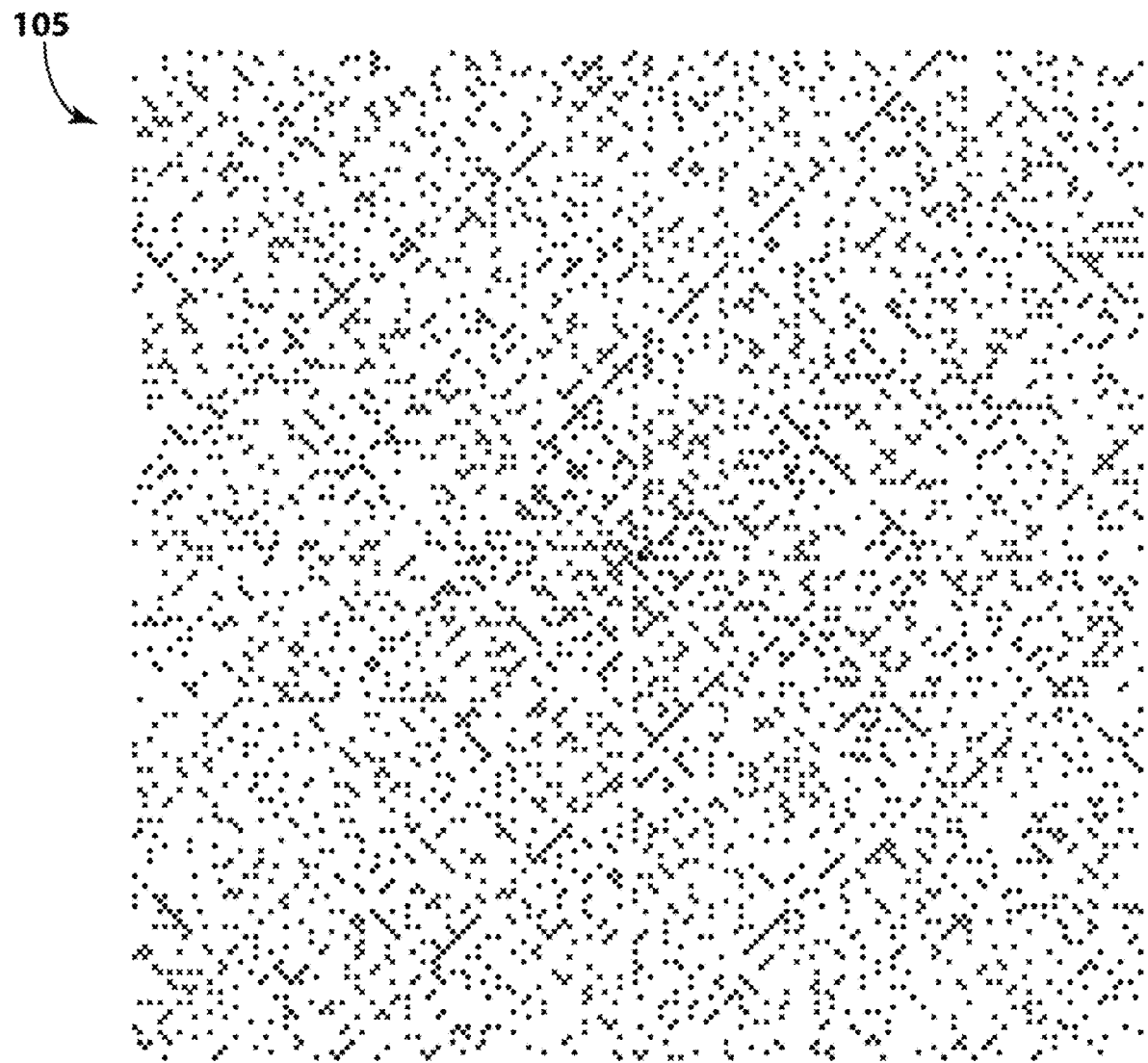
FIG. 1B is a second exemplary view of the prior art "Ulam spiral" arranged in a 200×200 matrix where black dots represent prime numbers.
Figure 1C:
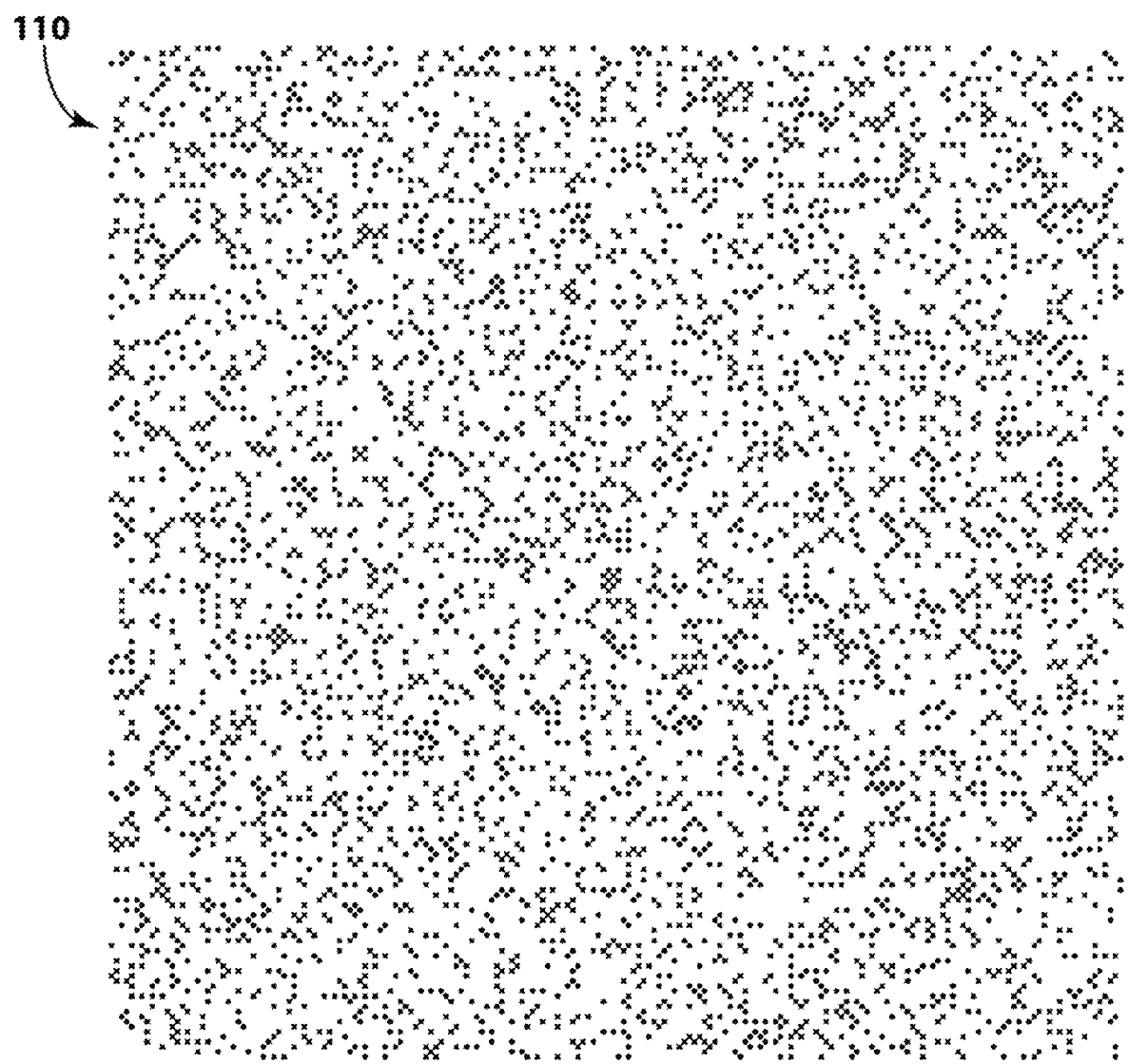
FIG. 1C is a comparison exemplary view of a similar constructed 200×200 matrix populated with random numbers where every odd number is colored black.
Figure 1D:
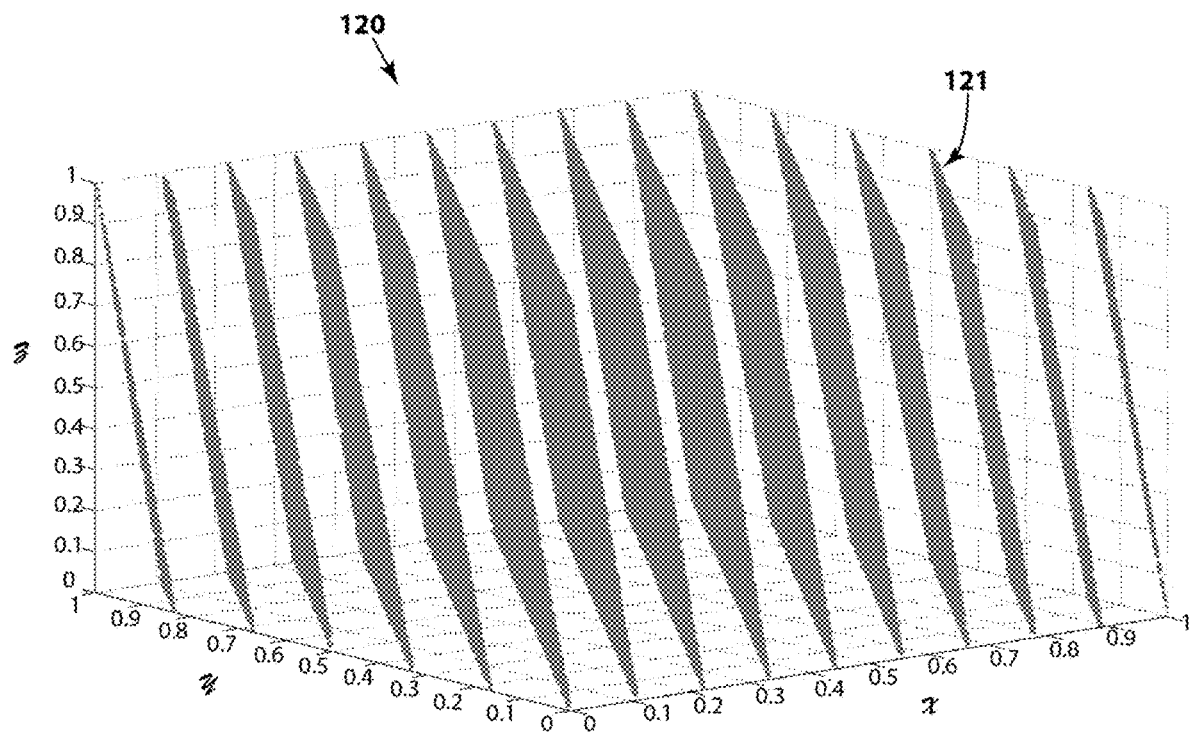
FIG. 1D is an exemplary view of IBM's prior art RANDU function plotting 100,000 "pseudorandom" output values in three dimensions.

Certain terminology is used herein for convenience only and is not to be taken as a limitation on the present invention. The words "a" and "an", as used in the claims and in the corresponding portions of the specification, mean "at least one." The abbreviations "AR" and "VR" denote "Augmented Reality" and "Virtual Reality" respectively. Augmented Reality (AR) is an interactive experience of a real-world environment whose elements are "augmented" by computer-generated perceptual information. While definitions of AR vary depending on the application, in the context of this invention AR denotes constructive (i.e. additive to the natural environment) overlaid visual and possibly audible sensory information seamlessly interwoven into images of the real world. Examples of existing AR platforms are: Apple iPhones®, Android® phones, Google Glass, Microsoft HoloLens, etc. AR augmented computer-generated perceptual information is referred to as "persistent digital objects", or "overlay images", or "visual digital image overlays" interchangeably throughout the specification and claims. Virtual Reality (VR) is an immersive interactive computer-generated experience taking place completely within a simulated environment. VR as used in the claims and in the corresponding portions of the specification denotes complete immersion into the computer-generated experience with no visual real world environment admitted and may also include audio. Examples of existing VR platforms are: Oculus, Windows Mixed Reality, Google Daydream, SteamVR headsets such as the HTC Vive & Vive Pro, etc.

A "wager" or "bet" are used interchangeably in the claims and in the corresponding portions of the specification means a gamble on predicting the outcome of an event in the future. Additionally, the terms "user," "player," or "consumer" are also used interchangeably all referring to a human individual utilizing the invention. Furthermore, the terms higher dimensions" or "higher dimensional environment" are used interchangeably in the claims and in the corresponding portions of the specification can mean "two dimensions", three dimensions", or more—e.g., a four dimensional AR and/or VR environmental model may include three special dimensions with the fourth dimension being a function of time. Finally, the term "Random Number Generator (RNG)" is used in the claims and in the corresponding portions of the specification for brevity, with the term "RNG" to be understood to mean all forms of random number generation—e.g., True Random Number Generator (TRNG), Pseudo Random Number Generator (PRNG), Mersenne Twister algorithms, Linear Congruential Generators (LNGs), etc.

Preferred embodiments of the present invention use AR and/or VR devices (interchangeably referred to herein as "one or more of Augmented Reality (AR) or Virtual Reality (VR) devices."

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Figure 2A:
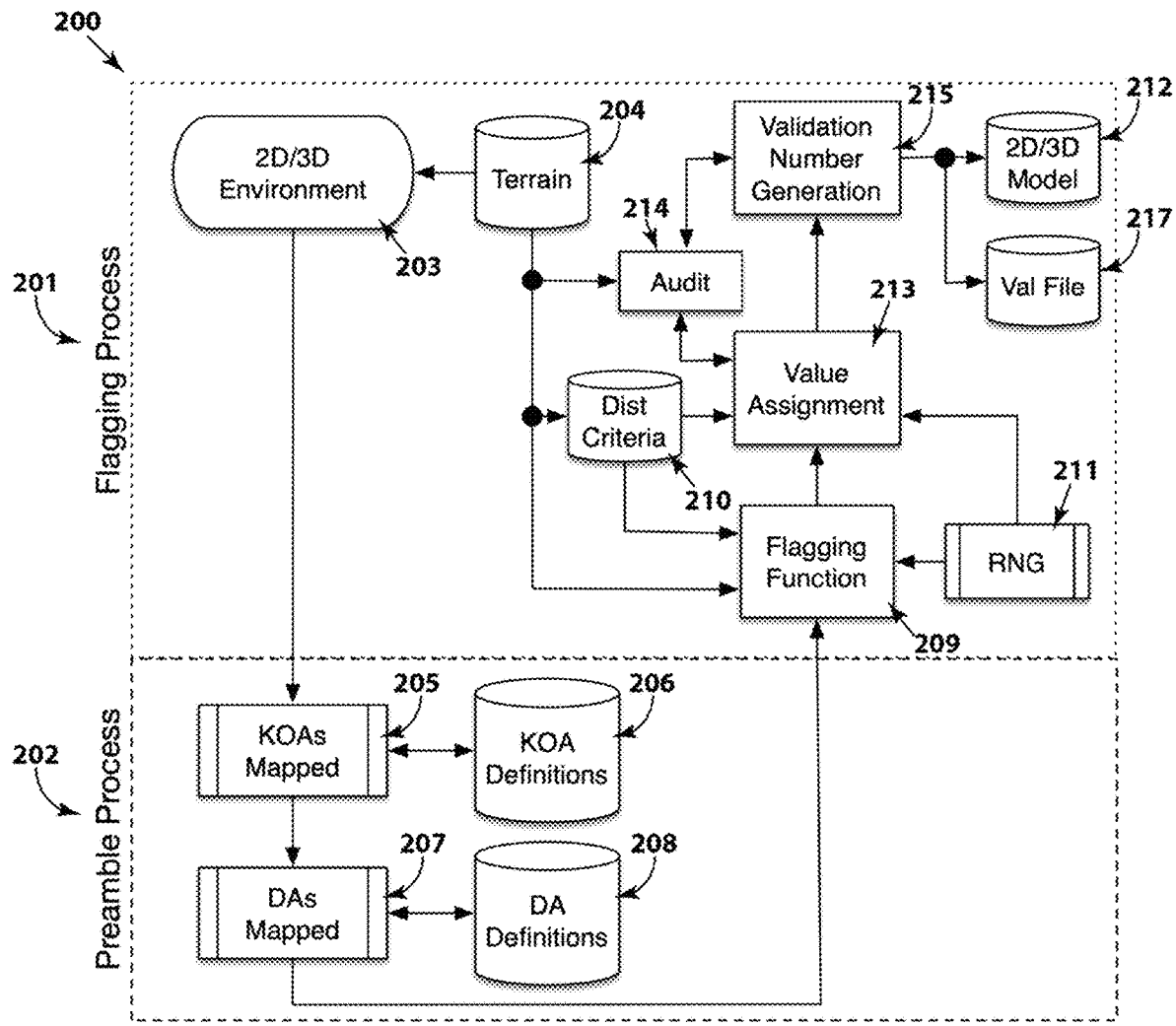
FIG. 2A is an overall swim lane block diagram representative example providing a schematic graphical overview of a general embodiment of the system associated with generating predetermined pseudorandom distribution of objects in higher dimensions with regard to Keep Out Areas (KOAs) and Desirable Areas (DAs)
Figure 2B:
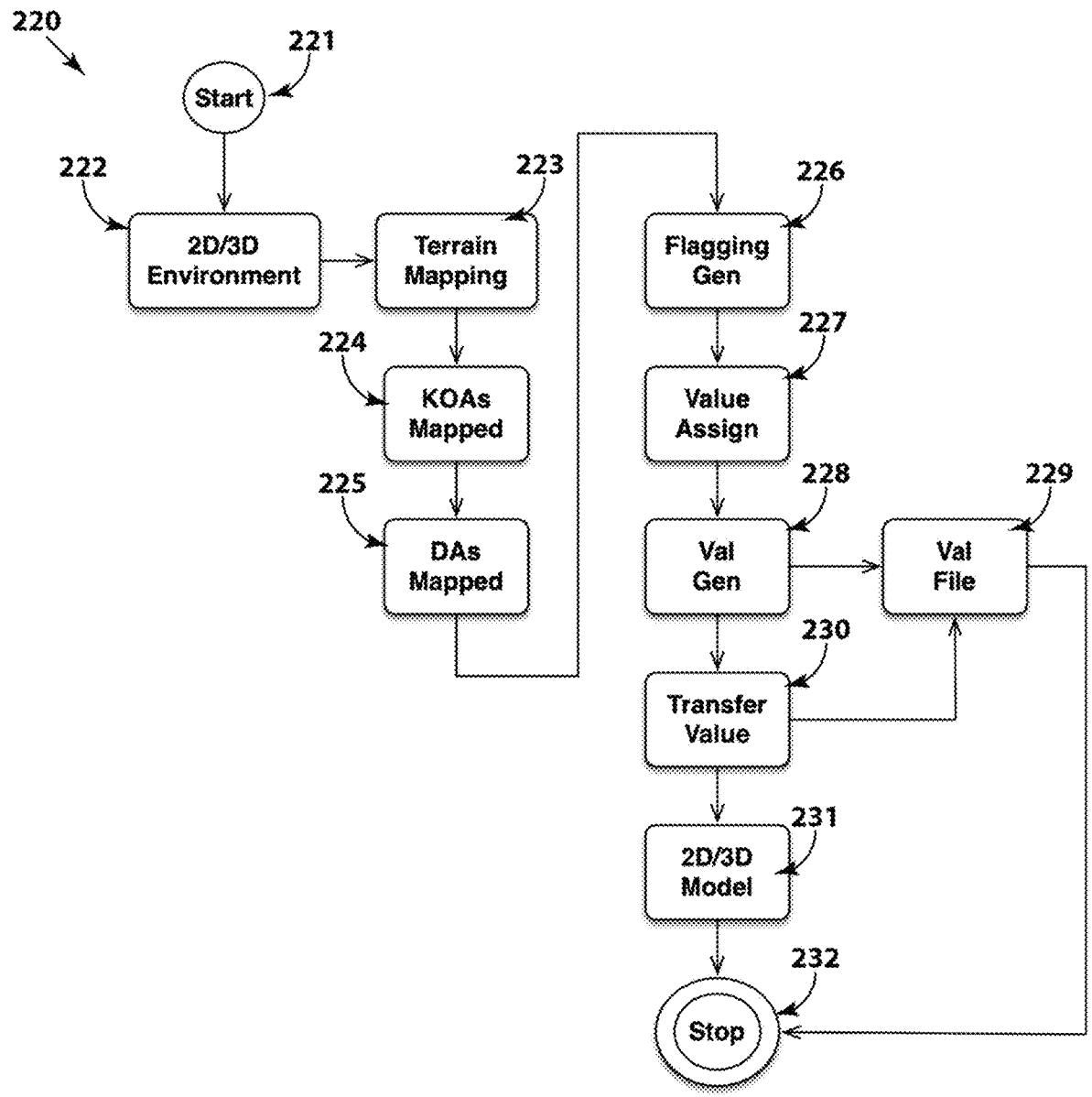
FIG. 2B is an overall logical state machine rendering representative example of the processes associated with the 2D/3D model and validation file generation in accordance with the embodiment of FIG. 2A.

FIGS. 2A thru 2E taken together, illustrate one general embodiment for predetermined assignment of flagged locations and associated values to a predefined two or higher dimensional environmental model compatible with both AR and VR applications. As illustrated in the swim lane flowcharts 200, 250, and 250' of FIGS. 2A, 2C, and 2D this general embodiments of the invention are conceptually divided into two groups (i.e., "Flagging Process" 201/251 and "Preamble Process" 202/252) by the two "swim lane" columns as shown in all three figures. If a particular flowchart function appears completely within a swim lane, its functionality is limited to the data category of the associated swim lane—e.g., KOA Definitions database 206 and 256 are exclusively part of the Preamble Process 202 and 252. FIG. 2B illustrates the state machine 220 associated with the embodiment 200 and 250 of FIGS. 2A and 2C.

FIG. 2E illustrates a specific alternative embodiment 275 for generating predetermined flagged locations with associated value assignments occurring in real time. While it should be appreciated that the generation of predetermined flagged locations of the specific alternative embodiment 275 is identical to the general embodiment of FIGS. 2A thru 2D, the subsequent assignment of values to encountered flagged locations in real time is unique to alternative embodiment 275.

In the exemplary system 200 general embodiment of FIG. 2A, flagged locations are ultimately assigned 209 in a predetermined two or three dimensional model 212. The general embodiment swim lane 200 starts with a specified two or three dimensional ("2D/3D") environment 203 (e.g., the Las Vegas strip, Disney World, the fictional environment in the Game of Thrones) where the layout and (optionally) elevation changes are mapped a priori in a dedicated Terrain database 204. The Terrain database 204 is comprised of a two or three dimensional map of the portions of the 2D/3D Environment 203 that are acceptable for flagging and/or placement of objects. In a preferred embodiment, the Terrain database 204 map will include significant items present on the 2D/3D Environment 203 (e.g., bodies of water, highways, buildings, legal borders, named businesses) that include metadata for identifying the items to the "Keep Out Areas" or "KOAs" 205 and "Desirable Areas" or "DAs" 207 mapping functions as well as the Flagging Function 209. Additionally, with three dimensional environments, the Terrain database 204 will typically include terrain mapping with associated metadata.

Preferably, the Preamble Process 202 analysis is conducted utilizing the dedicated Terrain database 204, where all portions of the 2D/3D Environment 203 are represented. The first portion of the Preamble Process 202 analysis is to map where various "Keep Out Areas" or "KOAs" 205 are before the Flagging Function 209 begins, thereby ensuring that no flagged location will appear in a KOA. Primarily, the KOAs are generated 205 based on sets of a priori rules or definitions maintained in a separate KOA database 206 specific to the 2D/3D Environment 203. In a real world AR environmental model, where consumers are interacting with the model in the real world, potentially hazardous or sensitive areas could be defined as KOAs. The KOA a priori rules or definitions maintained in a separate KOA database 206 are preferably a series of script based rules and/or definitions triggering on specific 2D/3D Environment 203 areas as described in the Terrain database 204 metadata. For example, one KOA database 206 definition script might demarcate "a KOA for ten feet on either side of a metadata identified road or highway as described in the Terrain database 204", a second KOA database 206 definition script might demarcate "a KOA for a one hundred foot circular radius centered around each metadata identified church as described in the Terrain database 204", a third three KOA database 206 definition script might demarcate a "three hundred feet radius centered around each metadata identified monument or memorial as described in the Terrain database 204", etc. In other words, in this embodiment, the KOA database 206 does not necessarily define specific KOA locations in the 2D/3D Environment 203, rather it can be configured with general rules or definitions that are automatically actuated by recognized items in the Terrain database 204, thereby defining the KOA geometric area(s) around the identified items. This is not to infer that all KOA entries in the KOA database 206 are of an abstract script definition type, in some special embodiments specific a priori KOA rules may be established—e.g., a KOA demarcated by a pentagon with the point coordinates 38.8897°-77.0089°, 38.38887°-77.0098°, 38.38877°-77.0092°, 38.38877°-77.0086°, and 38.38887°-77.0098°. Of course, as is apparent to one skilled in the art, other types of KOA database entries are possible (e.g., KOA over any body of water, KOA above a certain elevation) that may be desirable under some circumstances. The significant concept being to establish a KOA Definitions database 206 separate from the Terrain database 204 with the mapped KOAs 205 becoming simple defined areas in the 2D/3D Environment 203—i.e., the identity or the reason that a given area was defined as a KOA is not recorded in the 2D/3D Environment 203, only the KOA area itself is saved. By maintaining separate KOA 206 and Terrain 204 databases global rules and/or definitions may be readily implemented, modified, and/or transferred from one Terrain database 204 to another.

Returning to FIG. 2A, in addition to KOAs, optional "Desirable Areas" or "DAs" can be also added to the model where it is desirable to designate flagged areas as part of the preamble analysis—e.g., the location of a store paying for foot traffic to increase promotions. Similar to the KOA Definitions 206 database, the DA Definitions 208 is also maintained as a separate database where DA rules and/or definitions are stored. The DA Definitions 208 database drives the DAs Mapped algorithm 207 enabling recording of DAs in the 2D/3D Environment 203 with reference to the Terrain database 204. Primarily, the DA Definitions database 208 would typically be structured with defined exact locations (e.g., the Bellagio hotel and casino on the Vegas Strip) rather than predominately script based rules and/or definitions triggering on specific 2D/3D Environmental 203 areas. Of course, in some embodiments it may be desirable to include script based rules and/or definitions (e.g., any "Quick Trip" convenience store, any public park) in the DA Definitions 208 database. Regardless of the DA Definitions database 208 structure, the DA mapping function 207 would only record the DA area itself in the 2D/3D Environment 203, similar in operation to the KOA mapping function 207.

Once the Preamble Process 202 is concluded with the mapped KOAs 205 and DAs 207 identified and logged into the modified 2D/3D Environment 203 the Flagging Process 201 will commence with the Flagging Function 209 selecting, or flagging, actual locations in the 2D/3D Environment 203. The Flagging Function 209 accepts the Terrain 204, mapped KOA 205, and mapped DA 207 data and preferably utilizing outputs from a Random Number Generator (RNG) 211 to pseudorandomly assign flagged locations throughout the 2D/3D Environment 203. Primarily, this placement of flagged locations may be driven by a series of RNG 211 outputs defining locations to be flagged in the 2D/3D Environment 203. For example, sequential RNG 211 outputs may be modulo added with an a priori modulus to ensure that the resultant number would equate to $x/y$ or Latitude/Longitude values that are compatible with the area mapped by the Terrain database 204. Preferably, when the Flagging Function 209 receives a RNG 211 driven potential flagging location, each potential location is compared relative to all previously mapped KOAs 205 to determine if the candidate RNG 211 location falls within a KOA. If the candidate RNG 211 location does fall within a KOA the candidate RNG 211 location is rejected with a new candidate RNG 211 location generated, conversely if a candidate RNG 211 location does not fall within a KOA it becomes a flagged location saved into the 2D/3D Environment 203. This process will repeat until an a priori number of flagged locations have been generated as defined by Distribution Criteria database 210.

After an a priori number of RNG 211 flagged locations have been assigned that are all outside of any KOAs, the Flagging Function 209 will conduct an optional preferred audit of the generated flagged locations to determine if a sufficient number or percentage of the mapped DAs have been identified as flagged locations as defined by a priori data from the Distribution Criteria database 210. In the event that a sufficient number or percentage of the mapped DAs have been identified as flagged locations, this portion of the Flagging Function 209 will conclude. However, in the more likely event that an insufficient number or percentage of the mapped DAs have been identified as flagged locations, additional DAs will be flagged (preferably using the output of the RNG 211) until the Distribution Criteria database 210 requirements (i.e., minimum DA requirements) have been satisfied. If the number of additional DAs flagged and general flagged locations exceed some a priori limit, general flagged locations will be deleted from the non-DA flagged areas until the limit is achieved. For the special case of when the Distribution Criteria database 210 specifies that all DAs in a predefined location (e.g., a store chain) must be flagged in the database, then this special case DA flagging process will be completed prior to the above RNG 211 Flagging Process 201 commencing.

At this point an Audit 214 of the flagged locations will preferably be conducted to determine if the candidate locations are compatible with rules defined in the Distribution Criteria database 210. For example, the Distribution Criteria database 210 may specify that no two flagged locations may be within a predefined radius of each other, or that a given area must contain at least $x$ number of flagged locations, or that a given area must contain no more than $y$ flagged locations, etc. If the final audit fails, the flagging process would either restart or the automated process would halt requiring human intervention to continue. Conversely, if the final audit succeeds, the automated process will proceed to assigning values 213 to the flagged locations.

Notice that by employing a separate Value Assignment 213 function to determine what values (including a possible value of zero when no prize is awarded) are assigned to each flagged location there should be no correlation between the actual flagged location and the assigned value—i.e., the value and the location are independent of each other. This general embodiment of maintaining isolation between the location and value assignments provides one methodology to guard against unexpected correlations or predictability when increasing the number of dimensions for a pseudorandom prize distribution. Ideally, with this general embodiment, the Value Assignment 213 function is completely oblivious to the actual flagged locations or the concept of a location for that matter. In a specific embodiment, the Value Assignment 213 function receives a string of random numbers from the RNG 211, utilizing that string to assign values (or no value) to each flagged location with no cognizance of actual absolute or relative locations. In other words, in this embodiment, the Value Assignment 213 function simply assigns values to each flagged location in the database based on the RNG 211 string it is receiving. Thus, in this specific embodiment, no correlation between values and locations should be realized since each are a byproduct of independent processes.

In another preferred specific embodiment, a string of data from the RNG 211 is utilized to drive the Value Assignment 213 function, but in this preferred embodiment the total number of value slots to be awarded including no-value slots for a given 2D/3D Environment 203 are predefined and initially stored in a one-dimensional array with the Value Assignment 213 utilizing the RNG string to function as a mixer, systematically plucking value (or no value) from each entry in the array until the entire array is exhausted. With this specific embodiment, the plucking process would be driven by at least one output from the RNG 211 with each pseudorandom plucked value ultimately assigned to a location—i.e., the total number of predefined values in the one dimensional array would typically equal the number of locations to be populated. Therefore, with the innovation of a plucking process performing the Value Assignment 213 function, the one-dimensional value array is seamlessly expanded to two or three dimensional locations while ensuring that no correlation between values and locations is observed. This preferred embodiment having the advantage of an exact predefined prize structure that would also enable forensic audits.

Under some circumstances it may be desirable to place restrictions on the distribution of outcomes, including: limits on the number of high tier winners per area, how many consecutive adjacent non-winning locations are present within a predefined range, the maximum number of non-winning locations per area, a preponderance of value awarded to DS flagged areas, etc. While these restrictions would obviously reduce entropy (i.e., randomness) of value assignments relative to flagged locations, the perceived marketing benefits of partially directed prize location awards (e.g., "guaranteed prize in every store") may exceed the loss of entropy of value allocation per flagged location in terms of attractiveness. These types of restrictions of outcomes reducing entropy are preferably performed by the separate Audit function 214 that in this embodiment also receives a candidate 2D/3D environment (including values assigned to flagged locations) from the Value Assignment function 213, subsequently modifying the 2D/3D environment to be compliant with the desired restrictions of the distribution of outcomes in terms of the Terrain database 204. For example, in a preferred specific embodiment, the plucking process attempts to balance the outcome of price payouts to a long term Expected Value (EV) for consumer selection of objects within the two or three dimensional environmental model, to ensure that the consumer EV is maintained over any reasonable object selection distribution—e.g., evaluate the distribution of outcomes, include limits on the number of high tier winners per area, assess how many consecutive non-winning objects may be placed adjacent to each other. This preferred embodiment having the advantages of a more balanced prize distribution for the consumer, forced heterogeneous value distribution over two or three or more dimensions, and possibly greater environmental model longevity with the disadvantages of potentially lesser entropy and security as well as greater complexity.

Once the modification of the 2D/3D environment is completed, the finalized 2D/3D environment is passed from the Value Assignment function 213 to the separate Validation Number Generation function 215. Regardless of whether restrictions on the distribution of outcomes are implemented for a particular 2D/3D environment or not, the Audit function 214 will also perform a separate audit of the candidate 2D/3D environment to ensure that flagged locations and associated value assignments are within specification.

Finally, when the finalized 2D/3D environment is complete and the location value assignment Audit 214 is successfully concluded, the separate Validation Number Generation function 215 will execute to create unique validation numbers for every flagged location that are ultimately stored in a Validation File database 217. By assigning each flagged location at least one unique validation number, a separate Validation File database 217 can be generated where validation numbers are linked to assign values without any information being saved in the validation file concerning the associated flagged location. When the Validation Number Generation function 215 executes it creates a series of unpredictable pseudorandom validation numbers and assigns at least one validation number from the series to each flagged location. Once this assignment process is completed, the link between value and location is severed with the assigned values transferred to the validation numbers stored in a Validation File database 217 that is separate from the final generated 2D/3D flagged location model 212 that contains flagged locations and associated validation numbers, with the values assigned to each flagged location deleted.

Thus, by separately generating validation numbers assigned to each flagged location with the assigned values transferred to the validation number database, the 2D/3D flagged location model becomes completely independent of assigned values—i.e., the link between the assigned values and the flagged locations in the final 2D/3D Model 212 can only be achieved via the validation numbers that are stored in the associated Validation File database 217. More to the point, the final 2D/3D Model 212 only stores each flagged location with a validation number with no saved reference to any assigned value whatsoever. By first generating the flagged locations and assigning values to each flagged location various locational rules and restrictions may be applied that ensure pseudorandom desired prize distribution compliant with a priori rules (e.g., three or more prizes may not be awarded at locations in direct proximity of each other, distribution of prizes per capita over physical geographies are maintained, prizes are homogeneously distributed over the model, every DA is awarded a prize) that do not necessarily maximize entropy; however, at the same time security of the final 2D/3D Model 212 can nevertheless be ensured since granting accessing to the model will not divulge any information about assigned values—i.e., the value of a given flagged location can only be determined by accessing the linked Validation File database 217 with the appropriate validation number.

In one embodiment, the Validation File database 217 contains the identical validation numbers that are saved at every flagged location. This embodiment having the advantage of simplicity with the disadvantage of possibly reduced security. In another preferred embodiment, the Validation File database 217 contains clear text versions of each validation number assigned to each flagged location with the ciphertext version of the validation number saved in the 2D/3D Model 212 (or vice versa). With this preferred embodiment, the ciphertext validation numbers would be generated by encryption using the Validation File's asymmetrical private key or alternatively by encrypting the cleartext validation numbers with the asymmetrical private keys assigned to each flagged location, or the CRC or secure hash of the data contained in the flagged location plus cryptographic salt. In one of these alternative embodiments, the private keys assigned to each flagged location could be deleted after the encryption process was completed with their accompanying public keys saved in a separate database. In yet another embodiment, the validation numbers stored in the validation file database are keyed hashes of the validation numbers stored in the 2D/3D model 212 with the key being a universal key or specific to the 2D/3D model's 212 location (e.g., the latitude/longitude of a given location plus cryptographic salt). Regardless of the method of encryption or no encryption, it is preferred that a function be established that ensures that each validation number in the Validation File database 217 can only be accessed or validated once, thereby providing a higher level of security against nefarious attempts at "pick out."

As the Validation Number Generation function 215 completes its initial creation of the validation numbers and transfers the assigned values from the flagged locations to the Validation File database 217, the Audit 214 function should monitor the Validation Number Generation function 215 to abort the process with an error if duplicate validation numbers are created. Additionally, the Audit 214 function should monitor the Validation Number Generation function 215 to ensure that the validation file and the flagged locations database 212 does not contain duplicate validation numbers as well as ensuring that the transfer of assigned values occurred correctly. Once the Validation Number Generation function 215 successfully generates validation numbers, creates a Validation File database 217, and transfers the values from the flagged location database to the Validation File database 217 the process will terminate with a generated 2D/3D Model 212 and linked Validation File database 217.

Figure 2C:
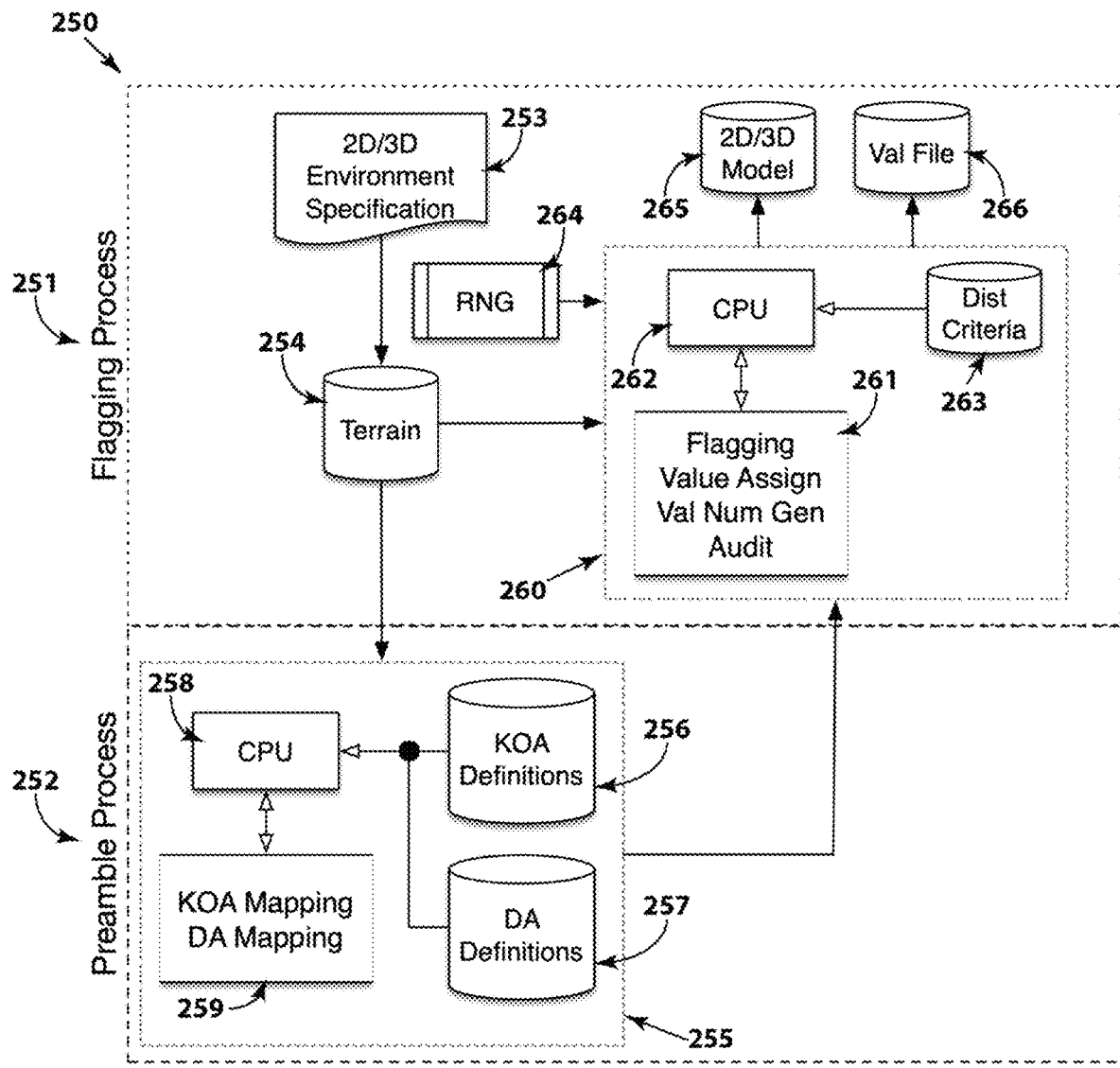
FIG. 2C is a representative example swim lane high level architecture diagram of the key components associated with the predetermined pseudorandom distribution of objects in higher dimensions of the swim lane block diagram of FIG. 2A.
Figure 2D:
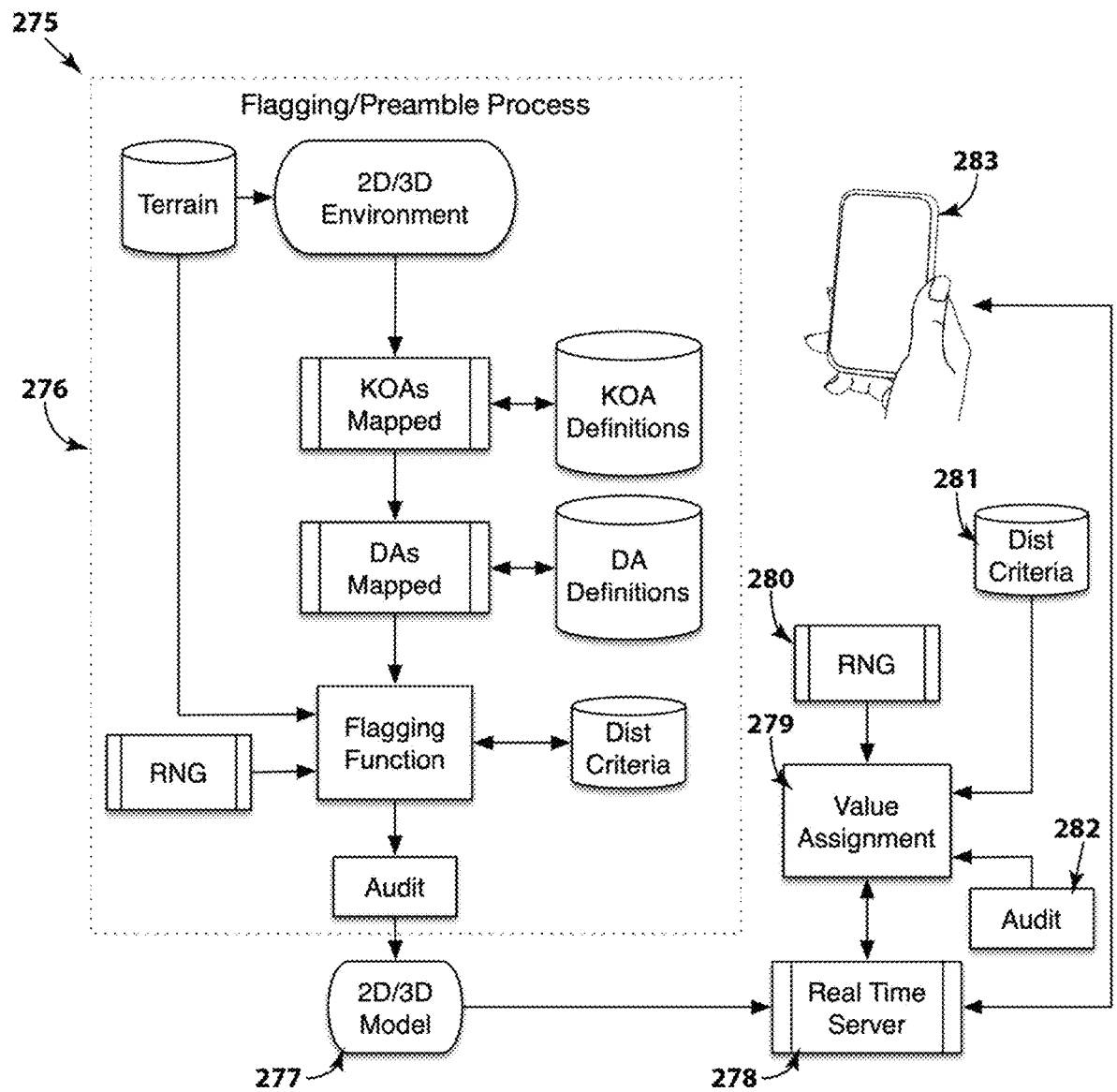
FIG. 2D is a specific block diagram representative example providing a schematic graphical overview of a general embodiment of the system associated with generating pseudorandom distribution of objects in higher dimensions with at least some of the value assignments of the locations defined in real time.

The associated state machine example 220 of FIG. 2B graphically depicts the various logical states of the embodiment of FIGS. 2A and 2C progressing from being in an initial Ready 221 state through the completion of a 2D/3D Model 231 and associated Validation file 229 and returning to a Ready state 232. From its initial Ready state 221, the process for assigning flagged locations to a predefined two or three dimensional environmental model progresses to defining a suitable 2D/3D Environment 222 as well as an accurate Terrain Map database 223 that digitally defines the environment preferably including metadata defining various objects (e.g., highways, bodies of water, points of interests). After this occurs, the KOA 224 and DA 225 mapping states ensue by utilizing the information in the Terrain Map database 223 with the resulting composite data (i.e., Terrain Map, KOAs, and DAs) passed on, which starts the Flagging Generation state 226. The Flagging Generation state 226 consults a Distribution Criteria database 210 (FIG. 2A) and preferably a RNG 211 to pseudorandomly flag a plurality of locations in the 2D/3D Model. After the Flagging Generation state 226 completes (FIG. 2B), the Value Assignment state 227 commences with each flagged location assigned a value (including no value). Next, the Validation Number Generation state 228 separately generates validation numbers for every flagged location with a copy of the same or interrelated validation numbers saved in a separate Validation File database 229. After the Validation File database 229 is created with a copy of the same or interrelated validation numbers, the Transfer Value 230 state begins with the previously assigned flagged location values transferred from the 2D/3D Model to the Validation File database 229 with all value data deleted from the 2D/3D model after the transfer is completed. Finally, at this point, the resulting 2D/3D Model 231 and Validation File database 229 are delivered and the state machine 220 stops 232.

Referring to the swim lane high level architecture diagram 250 of FIG. 2C, the process 250 begins, as previously with the flowcharts of FIG. 2A and the state diagram of FIG. 2B, by defining the 2D/3D Environment Specification 253 (e.g., Las Vegas strip, the Disney World, the fictional environment in the Game of Thrones) where the layout and (optionally) elevation changes are mapped a priori in a dedicated Terrain database 254. The 2D/3D Environment Specification 253 and dedicated Terrain database 254 are then used as the foundation data for all subsequent modeling processes. As illustrated in FIG. 2C, the 2D/3D Environment Specification 253 and dedicated Terrain database 254 are preferably embodied in a data source external to both the Preamble Server 255 and the Flagging Server 260 (e.g., Universal Serial Bus or "USB" memory stick, external server, ethernet server, Virtual Private Network or "VPN", Compact Disk or "CD") to allow for ready access from a plurality of individuals and/or organizations to ensure that the 2D/3D Environment Specification 253 and dedicated Terrain database 254 are accurate and current while providing additional security by also safeguarding physical isolation from the Preamble Server 255 and especially the Flagging Server 260. However, under some circumstances it may be more desirable to house the 2D/3D Environment Specification 253 and dedicated Terrain database 254 collocated in the Preamble Server 255 and/or possibly the Flagging Server 260.

Preferably, the Preamble Server functionality is conducted on a server 255 separate from the Flagging Server 260, similar to the paradigm associated with the separation of the 2D/3D Environment Specification 253 and dedicated Terrain database 254. This separation of the two servers allows for expanded access while at the same time enhancing security due to the physical and logical segregation of databases. Of course, in some embodiments the Preamble Server 255 and the Flagging Server 260 may be combined into one physical sever with the advantage of reduced hardware cost and complexity and the disadvantage of potentially reduced access and security.

Regardless of the server(s) configuration, the Preamble Process 252 analysis of mapping the KOAs and DAs is conducted with a Central Processing Unit (CPU) 258 accessing separate KOA and DA definition databases (256 and 257, respectively) where the actual KOA and DA mapping occurs in local memory 259. The mapping process primarily consisting of creating separate files in memory that demarcate KOAs and DAs 259 by referencing regions in the native format of the Terrain database 254 (e.g., latitude by longitude, $x/y$ coordinates, $x/y/z$ coordinates) without altering the Terrain database 254 itself. Once this mapping process is complete, the mapped data KOA and DA files are preferably transmitted to the Flagging Server 260.

Once the Preamble Process 252 is concluded with the mapped KOAs and DAs identified, a second Flagging Process server's 260 CPU 262 will flag actual locations in the 2D/3D Environment 253 in conjunction with the KOAs and DAs data received, also as a separate file in memory 261. During this process, the Flagging Server's 260 CPU 262 will preferably receive from a hardware RNG 264 (i.e., TRNG) a series of random number seeds that assist in pseudorandomly determining the flagged locations that are mapped to the Terrain database 254, typically in conjunction with the defined Distribution Criteria database 263. Preferably, this same server 260 will subsequently assign values to each flagged location, create the validation numbers, and audit the results 261. Finally, a separate 2D/3D Model 265 and Validation File database 266 are created in external non-volatile memory for later use by the AR and/or VR applications.

This is not to infer that both flagged locations and associated assigned values all need to be predetermined. In the specific embodiment 275 of FIG. 2D, the flagged locations are predetermined 276 as previously disclosed only now producing just a 2D/3D Model 277 without any corresponding validation file. This is possible, since value assignments in this specific embodiment 275 are executed in real time as each flagged location is discovered by a consumer with their AR or VR device 283. In this specific embodiment 275, the generated predetermined 2D/3D Model 277 is passed to a Real Time Server 278 thereby enabling real time interaction by a plurality of consumer devices 283 with the model 277. When a consumer encounters a flagged location 283 in this embodiment 275, the Real Time Server 278 queries a separate Value Assignment function 279 to determine the value (including a possible value of zero when no prize is awarded) of the encountered flagged location. Ideally, the Value Assignment function 279 resides on a physically separate server. Once queried, the Value Assignment function 279 ideally consults an external RNG 280 (i.e., TRNG) to determine the value (including a possible value of zero when no prize is awarded) of the encountered flagged location with the RNG 280 preferably returning a signed auditable random number that determines the basis for the encountered flagged location's value. In a preferred embodiment, this RNG 280 value is then equated to a priori Distribution Criteria 281 where the initial RNG 280 value may be modified or replaced if it is not in compliance with predetermined distribution rules (e.g., "six positive value assignments may not occur within a predefined radius") with the modified results Audited 282 to ensure that the a priori rules are fulfilled. Thus, in the specific embodiment 275, the flagged locations are predetermined with any value assignments executed in real time.

Of course, as would be apparent to one skilled in the art in view of this disclosure, there are other combinations and methods for assigning values to predetermined flagged locations that may under some circumstances be more desirable. For example, in an alternative embodiment low-tier and mid-tier values may be assigned in a predetermined manner with only high-tier locations undergoing a subsequent real time RNG "drawing" to determine the actual high-tier prize value (if any). This alternative embodiment having the advantage of a possible wider range of high-tier prizes (e.g., a prize insurance company may agree to offer a policy that would payout a billion dollars if the RNG produces an exceptionally unlikely outcome) that would not be possible with a normal fixed prize fund. In a second alternative embodiment example, a progressive real time high-tier jackpot system could be employed (i.e., a jackpot grand prize or payout which increases each time a flagged location is found but the jackpot is not won) where the progressive high-tier jackpot is funded via a small portion (e.g., 0.1%) of every lower-tier prize awarded from each located flagged location. In a third exemplary alternative embodiment, predetermined high-tier winning values could be eliminated entirely, with a subsequent real time RNG "drawing" occurring every time a non-winning flagged location is discovered where the RNG "drawing" may result in a high-tier winning value. This third exemplary alternative embodiment having the advantages of a predetermined prize fund as well as higher security since no a priori database would exist in the system that could potentially disclose the location of a high-tier winning location to a nefarious insider.

Figure 3A:
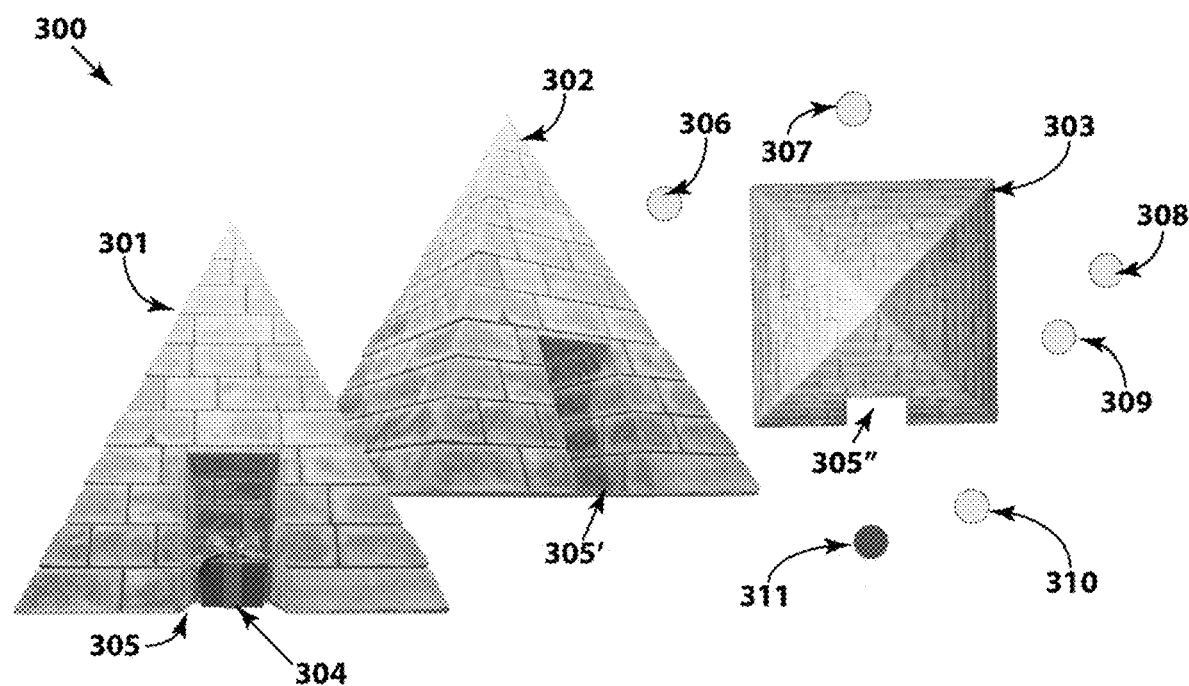
FIG. 3A is a three-dimensional projection of a portion of a topographical database as populated with the embodiments of FIGS. 2A thru 2D.

An example of the 2D/3D Model 265 of the disclosed embodiments of FIGS. 2A thru 2D is conceptually illustrated 300 in FIG. 3A. In this example 300, a three dimensional pyramid existing as a 3D Model is illustrated from three different perspectives 301, 302, and 303. As shown, the pyramid includes an alcove 305, 305', and 305" with a virtual present (prize) 304 placed in the alcove 305, 305', and 305". Various flagged locations (306 thru 311) are shown including a top down (i.e., bird's eye) view of the pyramid 303. As is apparent in this example 300, the only flagged location that could "see" the present (prize) 304 is flagged location 311 since the alcove 305" is only on one side of the pyramid and the present (prize) 304 is recessed in the alcove 305". Thus, in this specific example 300, flagged locations 306 thru 310 would have been assigned validation numbers equating to no value in the Validation File 266 (FIG. 2C) with only flagged location 311 (FIG. 3A) having a validation number with value.

Figure 3B:
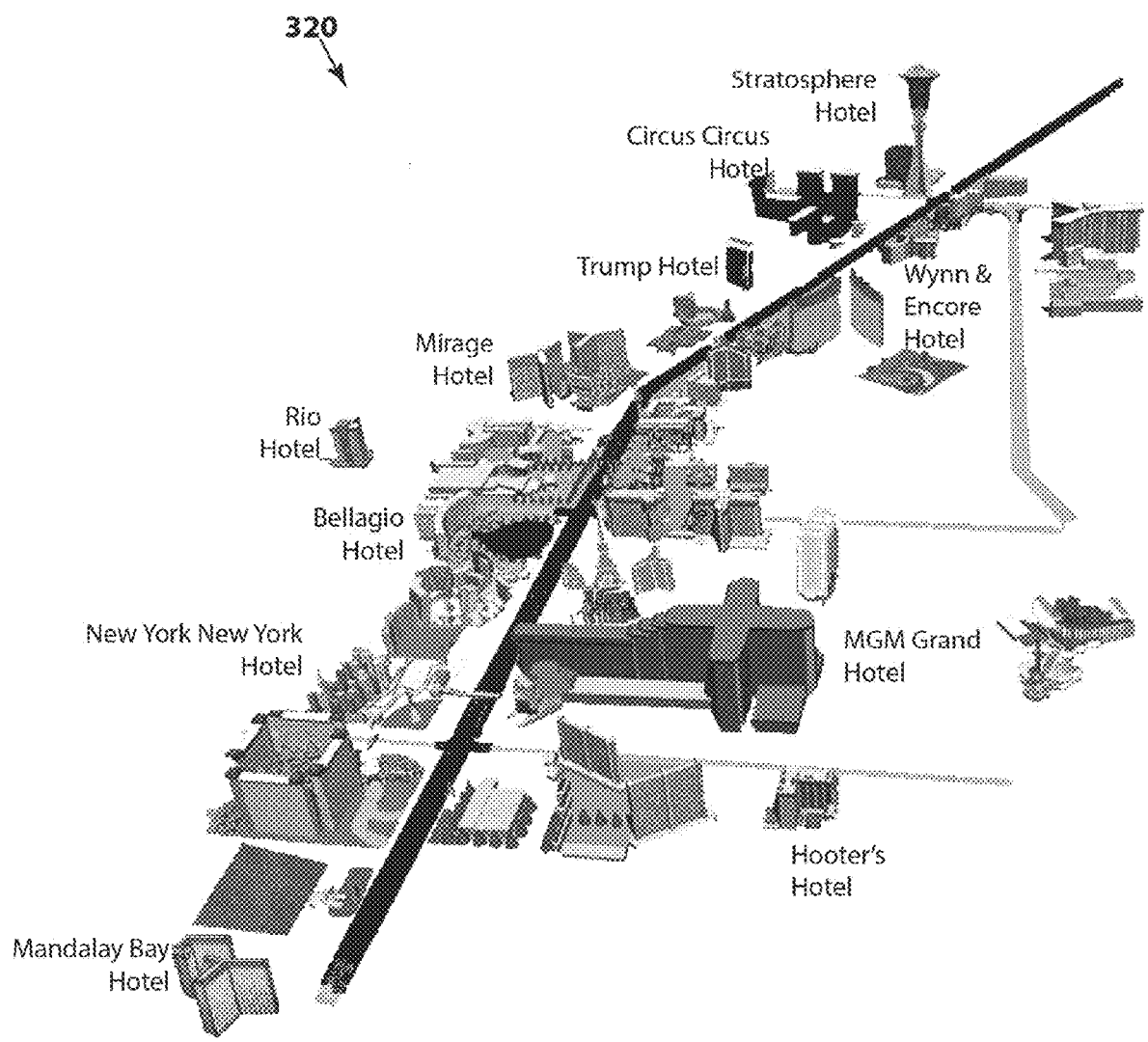
FIG. 3B is a three-dimensional environment of a portion of a topographical database of the Las Vegas Strip.

FIGS. 3B thru 3H taken together, provide a general example of the evolution of flagged locations when applied to a predefined three dimensional environmental model of the Las Vegas Strip. As shown in FIG. 3B, the three dimensional environmental model 320 of the Las Vegas Strip is limited to the major hotels and attractions in close proximity to the Las Vegas Strip and does not include further outlying locations (e.g., Downtown Vegas). Even though the environmental model 320 is of limited geographical scope, in this example, the planar $x/y$ -axes internal coordinates of the model would preferably by denoted in units of latitude and longitude with the elevation ($z$ -axis) as meters or feet above sea level for compatibility with existing prior art models of the Las Vegas Strip.

FIG. 3C provides an exemplary portion of a KOA database 325 shown in a human readable format for demonstrational purposes. As illustrated in FIG. 3C, the KOA database 325 is conceptually divided into four columns with each row 326 assigned an unique Item number. The Metadata Description column 327 allows for identifying KOA locations with generic tags (e.g., "Body of Water", "Vegas Strip") that are identifiable by the environmental model 320 (FIG. 3B). Thus, by enabling generic tags in the KOA database 325 (FIG. 3C) associated with the environmental model 320 (FIG. 3B), a single KOA entry may be applicable to multiple locations in the environmental model 320. In addition to generic tags, the Metadata Description column 327 (FIG. 3C) can also include specific tags (e.g., "Trump Hotel", "Circus Circus Hotel") that are also identifiable in the environmental model 320 of FIG. 3B, but only applicable to the specified location. Also, in FIG. 3C the Metadata Description column 327 can include specific locations (e.g., "#Defined Hazard Volcano") that would be manually defined (denoted in this example with a preamble hashtag "#" to ensure that the simulated natural gas volcano in front of the Mirage hotel would always be assigned a KOA location) including its own specified Grid Location as listed in column 329. Finally, FIG. 3C also includes a Modified Area column 328 that enables the KOA areas defined in environmental model 320 (FIG. 3B) to be expanded or contracted depending on the data stored in this column 328 (FIG. 3C) for its respective Item number 326.

Figure 3D:
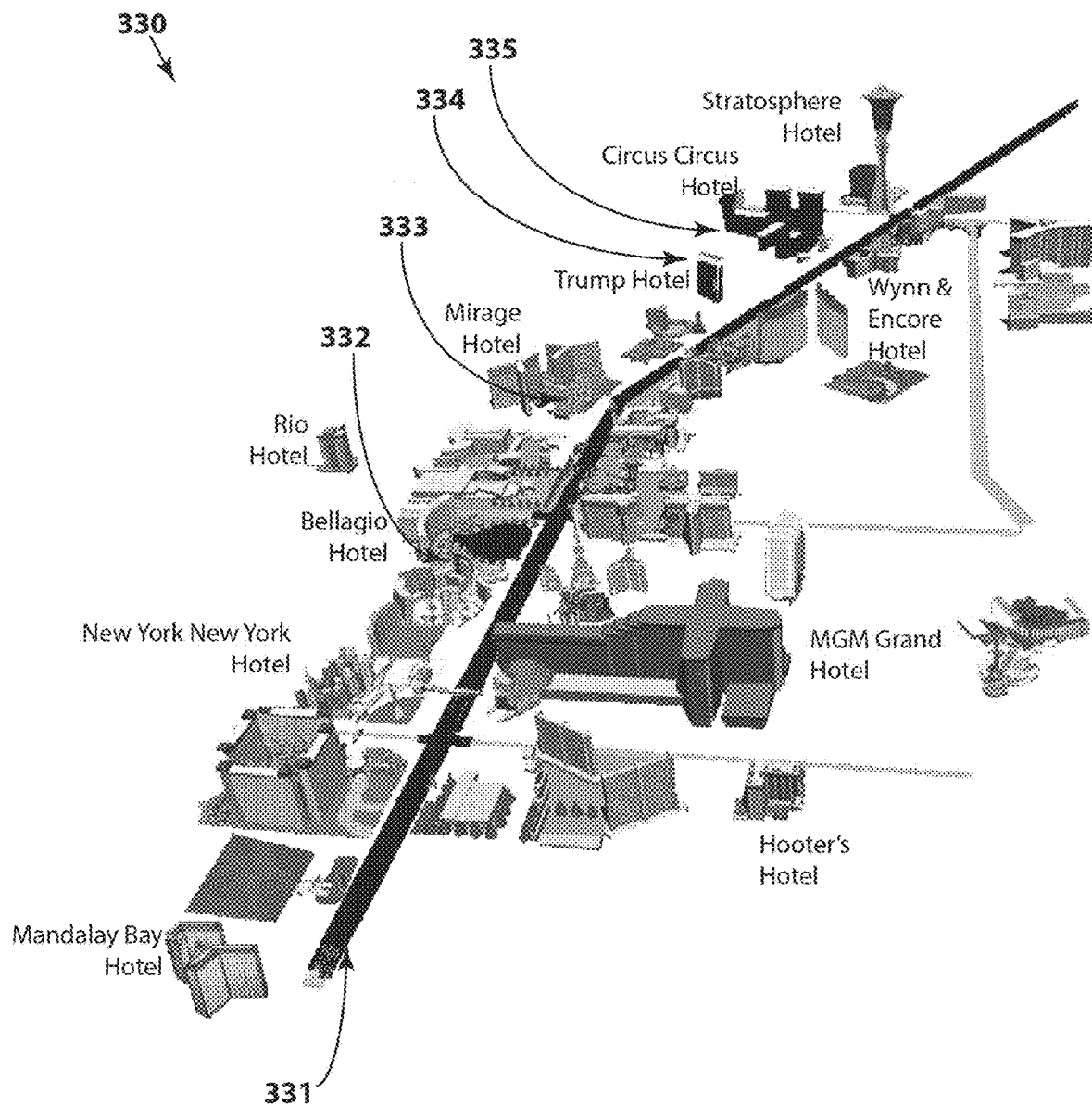
FIG. 3D is a modified three-dimensional environment portion of the topographical database of the Las Vegas Strip of FIG. 3B with the KOA of FIG. 3C highlighted.

After applying the KOA database 325 to the environmental model 320 of FIG. 3B, a modified version of the environmental model 330 that includes KOA locations is then generated as illustrated in FIG. 3D. This KOA modified environmental model 330 graphically illustrates how the KOA database parameters 325 of FIG. 3C were applied to create environmental model 330 (FIG. 3D). As shown, the KOA generic tag for "Body of Water" was automatically applied to Lake Bellagio 332 and the water features in front of the Mirage Hotel 333 (denoted by black coloring in this example). Additionally, the generic tag "Vegas Strip" also caused the entire Las Vegas Strip road along with a one meter parameter or easement to be defined as a KOA location. The specific tags of "Trump Hotel" and "Circus Circus Hotel" caused both properties (334 and 335) to be defined as KOA locations including a ten meter radius surrounding each property. Lastly, in this example, the manually defined Mirage hotel simulated volcano with a thirty meter radius surrounding its specified location was also identified as a KOA. It should be noted that while the Mirage hotel simulated volcano physically borders the Mirage water features a manually defined KOA location was entered to ensure that this potentially hazardous feature would never become a flagged location.

In the next phase of the environmental model's development the DA locations are first specified by a DA database (FIG. 3E) and then applied to the modified environmental model 330 (FIG. 3D) to add the newly specified DA locations. As before, FIG. 3E lists the DA database 339 in human readable for demonstrational purposes.

As illustrated in FIG. 3E, the DA database 339 is conceptually divided into four columns with each row 321 assigned its unique Item number. The Metadata Description column 322 allows for identifying DA locations generic (not shown in FIG. 3E), specific, and manual (not shown in FIG. 3E) tags that are identifiable by the modified environmental model 330 of FIG. 3D. In the event of a conflict between KOA and DA locations (where the same location was assigned both a KOA and DA specification) the KOA specification will be adopted with the conflict preferably generating an error code. The Modified Area 323 and Grid Location 324 columns perform similar functions as previously described for the KOA database 325 of FIG. 3C.

Figure 3F:
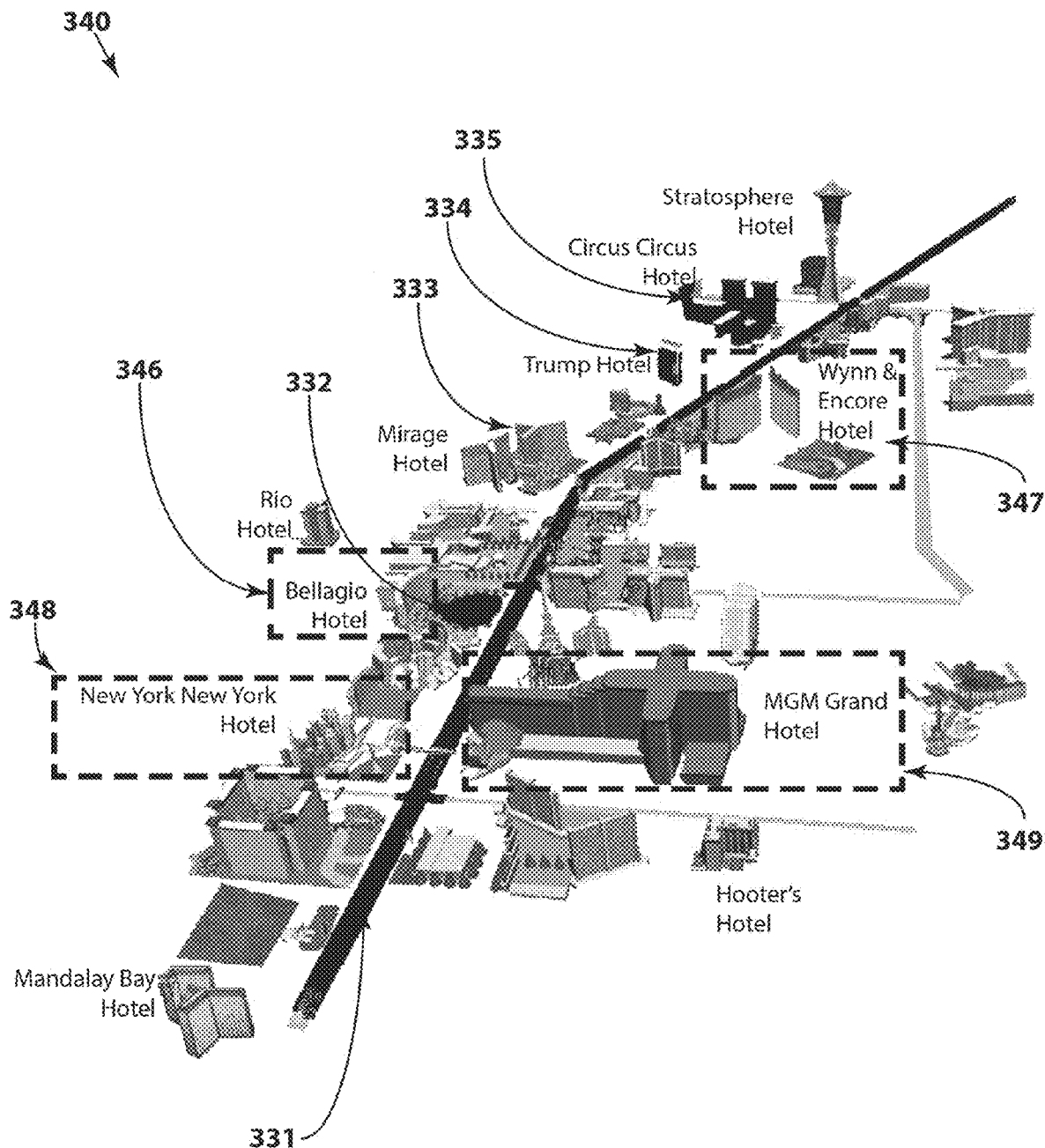
FIG. 3F is a modified three-dimensional environment portion of the topographical database of the Las Vegas Strip of FIG. 3B with the KOA of FIG. 3C and the DA of FIG. 3E highlighted.

After applying the DA database 339 (FIG. 3E) to the environmental model 330 of FIG. 3D, a modified version of the environmental model 340 that also includes DA locations is generated as illustrated in FIG. 3F. This KOA and DA modified environmental model 340 graphically illustrates how the KOA database parameters 325 of FIG. 3C and the DA parameters of FIG. 3E were applied to create the common modified environmental model 340 of FIG. 3F. As shown, the newly added DA locations of the Bellagio hotel 346, MGM Grand hotel 349, New York New York hotel 348, and the Wynn and Encore 347 hotels were added in separate areas from the previously defined KOA locations (332, 333, 334, and 335) thereby creating a second tier modified environmental model 340 suitable for the flagging process.

Figure 3G:
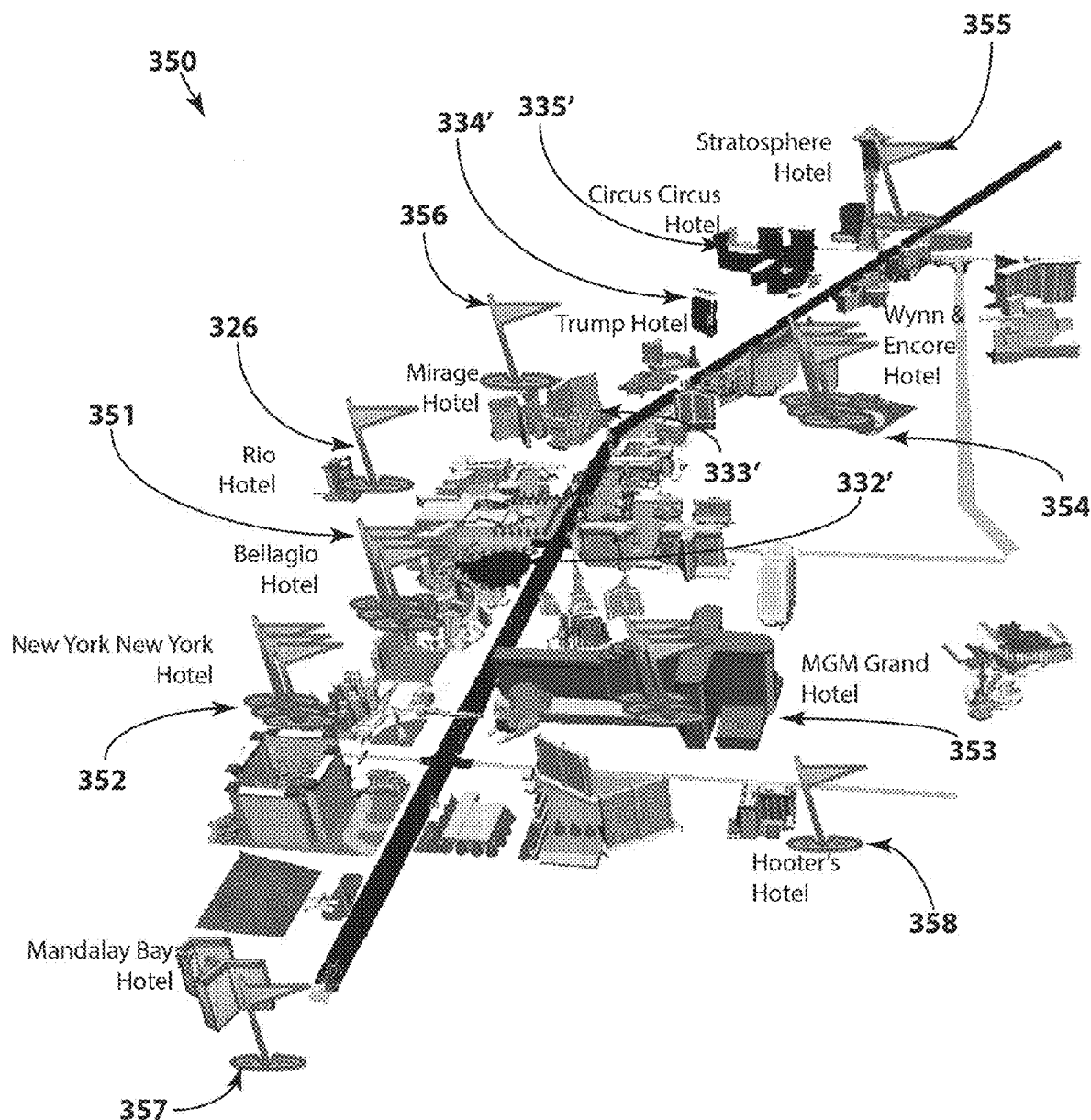
FIG. 3G is a modified three-dimensional environment portion of the topographical database of the Las Vegas Strip of FIG. 3B illustrating various flagged areas.

The newly generated KOA and DA modified environmental model 340 is then incorporated by the Flagging Function 209, Value Assignment process 213, and Validation Number Generation process 215 (all of FIG. 2A) to flag locations in the original three dimensional environmental model 320 of the Las Vegas Strip (FIG. 3B) ultimately generating a new flagged location environmental model 350 as shown in FIG. 3G (also shown as 212 in FIG. 2A) with an associated validation file 217. This new environmental model 350 of FIG. 3G was generated with the KOA and DA definitions previously described modifying flagged locations to appropriate areas with the aid of a random or pseudorandom process. In the model 350 of FIG. 3G, multiple flags were assigned to each DA location (three each in this example), specifically the Bellagio 351, MGM Grand 353, New York New York 352, and Wynn and Encore 354 hotels with other single flagged locations also created (i.e., the Rio 326, Mandalay Bay 357, Hooter's 358, and Stratosphere 355 hotels). However, no flagged locations were assigned to any of the KOA locations (332' thru 335'). Once the flagged locations are determined, a separate Value Assignment process 213 (FIG. 2A) randomly or pseudorandomly distributes value or prizes throughout the flagged locations in accordance with any specified Distribution Criteria 210. After the prize assignments and the flagged locations are optionally audited 214 a separate Validation Number Generator 215 assigns validation numbers to each flagged location with a ciphertext embodiment of the assigned validation numbers saved in the newly constructed flagged 3D Model 212 (also show as the example embodiment 350 of FIG. 3G) and associated Validation File 217 (FIG. 2A).

FIG. 3H illustrates a conceptual view 375 of the exemplary embodiment of FIG. 3G assigned validation numbers both as ciphertext 378 (FIG. 3H) and cleartext 378' (stored in the validation file denoted by a shaded gray area). As before, in the FIG. 3H conceptual view 375, the listings are shown in a human readable format with each row depicting a different flagged location 376. In this example, the Metadata Description column 377 is superfluous from a machine processing perspective and is included for human illustrative purposes only. Both the ciphertext 378 (saved at each flagged location) and the cleartext 378' (saved in the validation file) versions are listed in this example as 32-bit hexadecimal numbers denoted by the sixteen subscript "16". Thus, in this example, while each flagged location does include a ciphertext 378 version of the validation number its link to the associated cleartext version (where the prize value, if any, is also listed) is not apparent to a nefarious insider unless the nefarious insider also has access to the decryption key.

Finally, while the previous embodiments disclosed two and three dimensional models, it should not be construed that the invention is limited to only two or three dimensions. For example, a four dimensional AR and/or VR environmental model may be desirable that includes three special dimensions with a fourth dimension being a function of time—i.e., the flagged locations and/or assigned values change locations in the three dimensional space periodically.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A method of automatically assigning flagged locations that are potentially discoverable when encountered by one or more of Augmented Reality (AR) or Virtual Reality (VR) devices and assigning a value to each flagged location which is revealed when the one or more AR or VR devices encounters a flagged location, the method comprising:
   (a) maintaining a terrain database that is comprised of a higher dimensional map of portions of an environmental model that establishes a total area of the higher dimensional environmental model;
   (b) generating flagged locations in the terrain database utilizing input from a Random Number Generator (RNG) function;
   (c) automatically assigning, with a real time server, a value to each of the flagged locations when an AR or VR device discovers a flagged location; and
   (d) displaying the assigned value to the AR or VR device that discovered the respective flagged location.

2. The method of claim 1 wherein the assigned value is assigned by a Random Number Generator (RNG).

3. The method of claim 2 wherein the RNG that assigns the assigned value is a True Random Number Generator (TRNG).

4. The method of claim 2 wherein the RNG that assigns the assigned value outputs a digitally signed auditable random number.

5. The method of claim 1 wherein step (c) further comprises:
   (i) auditing the assigned value to determine if the assigned value is in compliance with predetermined distribution rules, and
   (ii) modifying the assigned value if the assigned value is not in compliance with the predetermined distribution rules.

6. The method of claim 1 wherein all generated flagged locations are not within any Keep Out Areas (KOAs).

7. The method of claim 1 wherein at least a portion of the generated flagged locations are within Desirable Areas (DAs).

8. The method of claim 1 wherein the higher dimensional environmental model is two-dimensional.

9. The method of claim 1 wherein the higher dimensional environmental model is three-dimensional.

10. The method of claim 1 wherein the higher dimensional environmental model is four-dimensional, and wherein the fourth dimension is time with the flagged locations changing locations periodically.

11. The method of claim 1 wherein the assigned value is retrieved from a predetermined database when the assigned predetermined prize value has a low-tier or mid-tier value, and the assigned value is assigned by a Random Number Generator (RNG) in real time when the prize value is high-tier.

12. The method of claim 1 wherein the assigned value is retrieved from a predetermined database when the assigned predetermined prize value has a low-tier or mid-tier value, and the assigned value is assigned by a Random Number Generator (RNG) in real time when the predetermined prize value was non-winning.

13. The method of claim 1 wherein at least a portion of the assigned value is a progressive jackpot with its outcome determined by a Random Number Generator (RNG) in real time.

14. An apparatus for automatically assigning flagged locations that are potentially discoverable when encountered by one or more of Augmented Reality (AR) or Virtual Reality (VR) devices and assigning a value to each flagged location which is revealed when the one or more AR or VR devices encounters a flagged location, the apparatus comprising:
  (a) a terrain database that is comprised of a higher dimensional map of portions of an environmental model that establishes a total area of the higher dimensional environmental model;
  (b) a Random Number Generator (RNG) function configured to generate flagged locations in the terrain database; and
  (c) a real time server configured to:
    (i) automatically assign a value to each of the flagged locations when the flagged locations are discovered by an AR or VR device, and
    (ii) display the assigned value to the AR or VR device that discovered the respective flagged location.

15. The apparatus of claim 14 wherein the assigned value is assigned by a Random Number Generator (RNG).

16. The apparatus of claim 15 wherein the RNG that assigns the assigned value is a True Random Number Generator (TRNG).

17. The apparatus of claim 15 wherein the RNG that assigns the assigned value outputs a digitally signed auditable random number.

18. The apparatus of claim 14 wherein all generated flagged locations are not within any Keep Out Areas (KOAs).

19. The apparatus of claim 14 wherein at least a portion of the generated flagged locations are within Desired Area (DAs).

20. The apparatus of claim 14 wherein the higher dimensional environmental model is four-dimensional, and wherein the fourth dimension is time with the flagged locations changing locations periodically.

* * * * *